US010300990B2

(12) United States Patent
Vezina

(10) Patent No.: US 10,300,990 B2
(45) Date of Patent: May 28, 2019

(54) SNOWMOBILE FUEL TANK

(71) Applicant: BOMBARDIER RECREATIONAL PRODUCTS INC., Valcourt (CA)

(72) Inventor: Sebastien Vezina, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 241 days.

(21) Appl. No.: 15/505,264

(22) PCT Filed: Aug. 31, 2015

(86) PCT No.: PCT/IB2015/056604
§ 371 (c)(1),
(2) Date: Feb. 21, 2017

(87) PCT Pub. No.: WO2016/030870
PCT Pub. Date: Mar. 3, 2016

(65) Prior Publication Data
US 2017/0247084 A1     Aug. 31, 2017

Related U.S. Application Data

(60) Provisional application No. 62/043,966, filed on Aug. 29, 2014.

(51) Int. Cl.
  B62M 27/02      (2006.01)
  B62J 35/00      (2006.01)
(52) U.S. Cl.
  CPC ............. B62M 27/02 (2013.01); B62J 35/00 (2013.01); *B62M 2027/028* (2013.01)
(58) Field of Classification Search
  CPC ... B62M 27/02; B62M 2027/028; B62J 35/00
      (Continued)

(56) References Cited

U.S. PATENT DOCUMENTS 1,207,020 A    12/1916   Gold et al.
3,967,692 A     7/1976   Hoffman
          (Continued)

FOREIGN PATENT DOCUMENTS

CA    2498573    *  9/2005  .............. B62D 5/07
RU    2517918 C2    6/2014

OTHER PUBLICATIONS

International Search Report of PCT/IB2015/056604; Shane Thomas; dated Jan. 6, 2016.
          (Continued)

*Primary Examiner* — Anne Marie M Boehler
(74) *Attorney, Agent, or Firm* — BCF LLP

(57)  ABSTRACT

A snowmobile frame includes a tunnel, an engine cradle, a front suspension, a forward support and a fuel tank having a lower and an upper wall connected together 5 to enclose a volume. The volume fluidly communicates with the engine and has a portion extending upwardly and forwardly from the tunnel to the forward support. The fuel tank is removably connected to the tunnel and the forward support by the upper wall which has a left and a right lower end portion respectively connected to the tunnel on a left and right side of the longitudinal centerplane, and an upper end 10 portion connected to the forward support. The lower wall is connected to the upper wall above lower end portions and below the upper end portion. A force transmitted between the forward support and the tunnel, via the fuel tank, is transmitted through the upper wall without passing through the lower wall.

26 Claims, 18 Drawing Sheets

(58) Field of Classification Search
USPC .................................. 180/190; 280/831, 833
See application file for complete search history.

(56) References Cited

U.S. PATENT DOCUMENTS

| | | | |
|---|---|---|---|
| 5,626,776 A | 5/1997 | Morris | |
| 5,975,230 A | 11/1999 | Bourget | |
| 6,186,550 B1 | 2/2001 | Horii et al. | |
| 6,484,837 B1 | 11/2002 | Buell et al. | |
| 6,516,910 B2 | 2/2003 | Buell et al. | |
| 6,651,764 B2 | 11/2003 | Fournier et al. | |
| 6,837,328 B2 | 1/2005 | Neugebauer et al. | |
| 7,014,004 B2 | 3/2006 | Etou | |
| 7,156,067 B1 | 1/2007 | Gottschalk | |
| 7,367,418 B2 | 5/2008 | Eide | |
| 7,390,023 B2 * | 6/2008 | Hirose | B62J 35/00 180/219 |
| 7,469,764 B2 | 12/2008 | Girouard et al. | |
| 7,543,669 B2 | 6/2009 | Kelahaara | |
| 7,690,467 B2 | 4/2010 | Sheahan et al. | |
| 7,926,607 B2 | 4/2011 | Setter | |
| 7,934,738 B2 | 5/2011 | Prielinger et al. | |
| 7,963,358 B2 | 6/2011 | Buell et al. | |
| 7,975,799 B2 | 7/2011 | James et al. | |
| 7,980,629 B2 | 7/2011 | Bedard | |
| 2002/0020573 A1 | 2/2002 | Fournier et al. | |
| 2002/0112909 A1 | 8/2002 | Nishijima | |
| 2003/0029663 A1 | 2/2003 | Etou | |
| 2006/0070782 A1 | 4/2006 | Morin et al. | |
| 2006/0175107 A1 * | 8/2006 | Etou | B62M 27/02 180/190 |
| 2008/0142287 A1 | 6/2008 | Simmons et al. | |
| 2008/0179151 A1 * | 7/2008 | Chisuwa | B62J 35/00 188/379 |
| 2008/0185203 A1 | 8/2008 | Matsudo | |
| 2008/0185204 A1 | 8/2008 | Matsudo | |
| 2009/0206626 A1 | 8/2009 | Bedard | |
| 2009/0211827 A1 | 8/2009 | Watson et al. | |
| 2010/0059978 A1 | 3/2010 | Yamada | |
| 2010/0193275 A1 | 8/2010 | Song et al. | |
| 2011/0132679 A1 | 7/2011 | Kerner et al. | |
| 2011/0192667 A1 | 8/2011 | Conn et al. | |
| 2016/0200397 A1 | 7/2016 | Vezina et al. | |

OTHER PUBLICATIONS

C3 XP and XR Carbon Fiber Chassis; DOOTalk Forums; Aug. 11, 2009; retrieved from http://www.dootalk.com/forums/topic/322220-c3-xp-and-xr-carbon-fiber-chassis/ on Feb. 16, 2017.
Carbon Fiber Chassis—1200/XP; DOOTalk Forums; Jun. 11, 2009; retrieved from http://www.dootalk.com/forums/topic/317874-carbon-fiber-chassis-1200xp/ on Feb. 16, 2017.
XM/XP/XR Carbon Fiber Chassis; C3 Powersports; retrieved from https://c3powersports.com/products/xmxpxr-carbon-fiber-chassis-discontinued on Feb. 17, 2017.
Russian Search Report issued by the Rospatent in connection with Russian Patent Application No. 2017107087; Feb. 20, 2019.
English translation of RU2517918C2 retrieved from http://translationportaLepo.org/on Feb. 27, 2019.

* cited by examiner

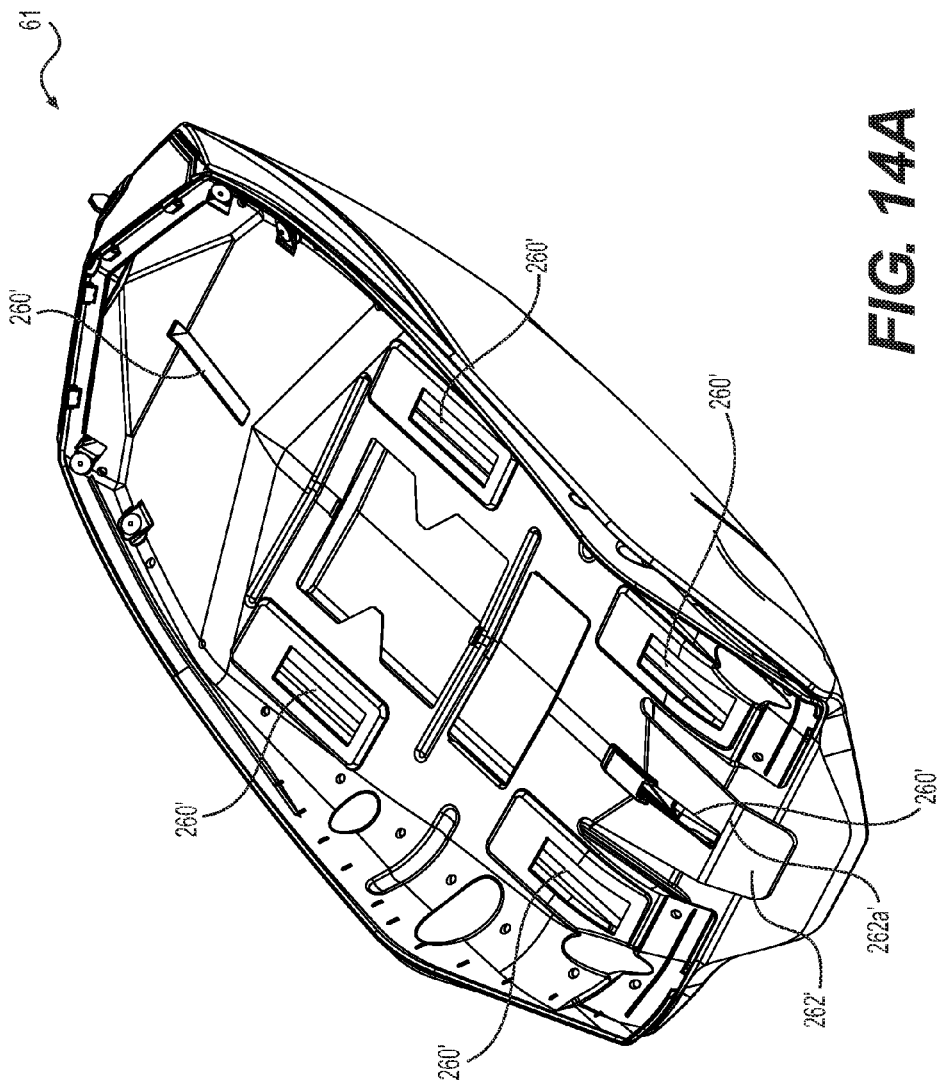

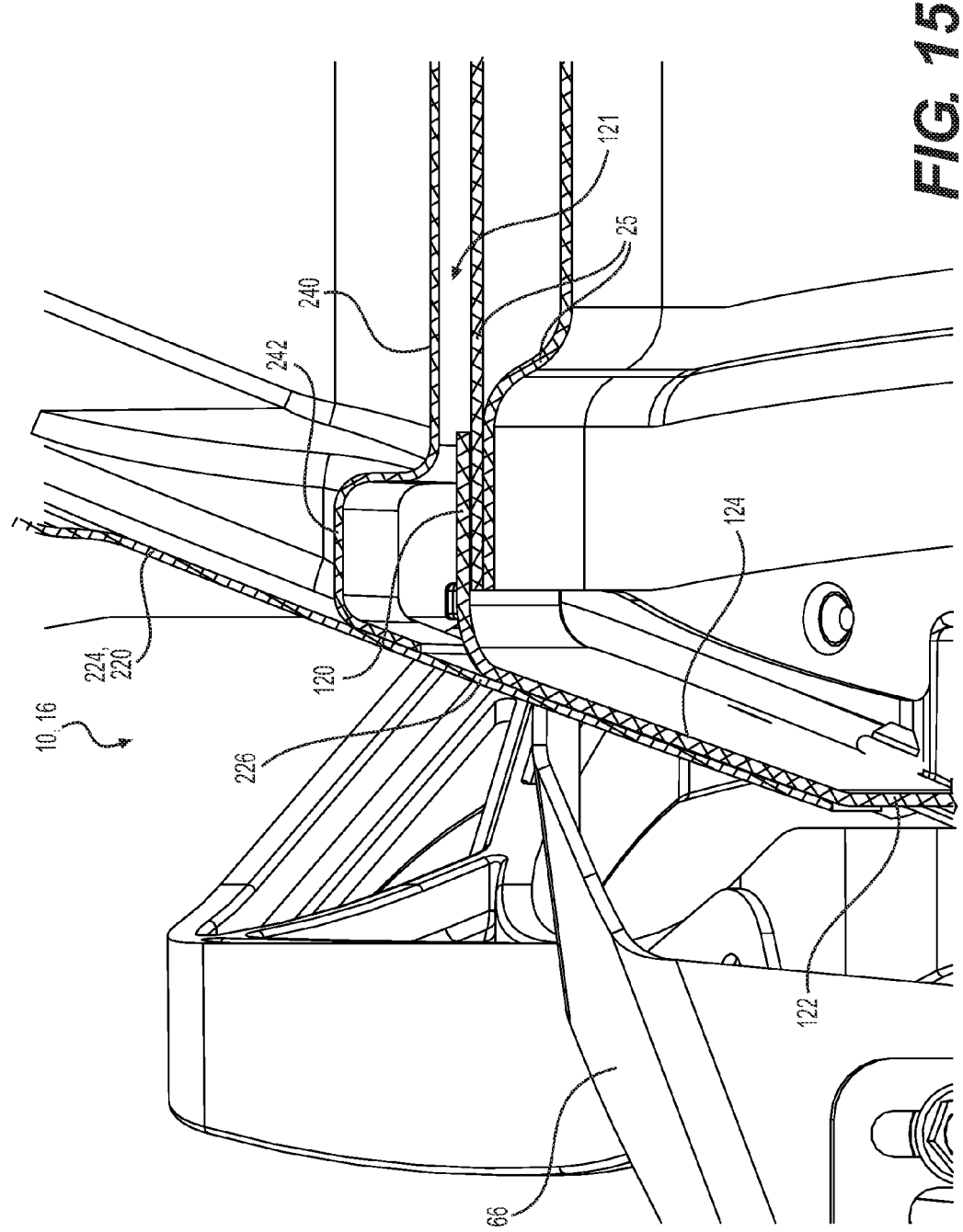

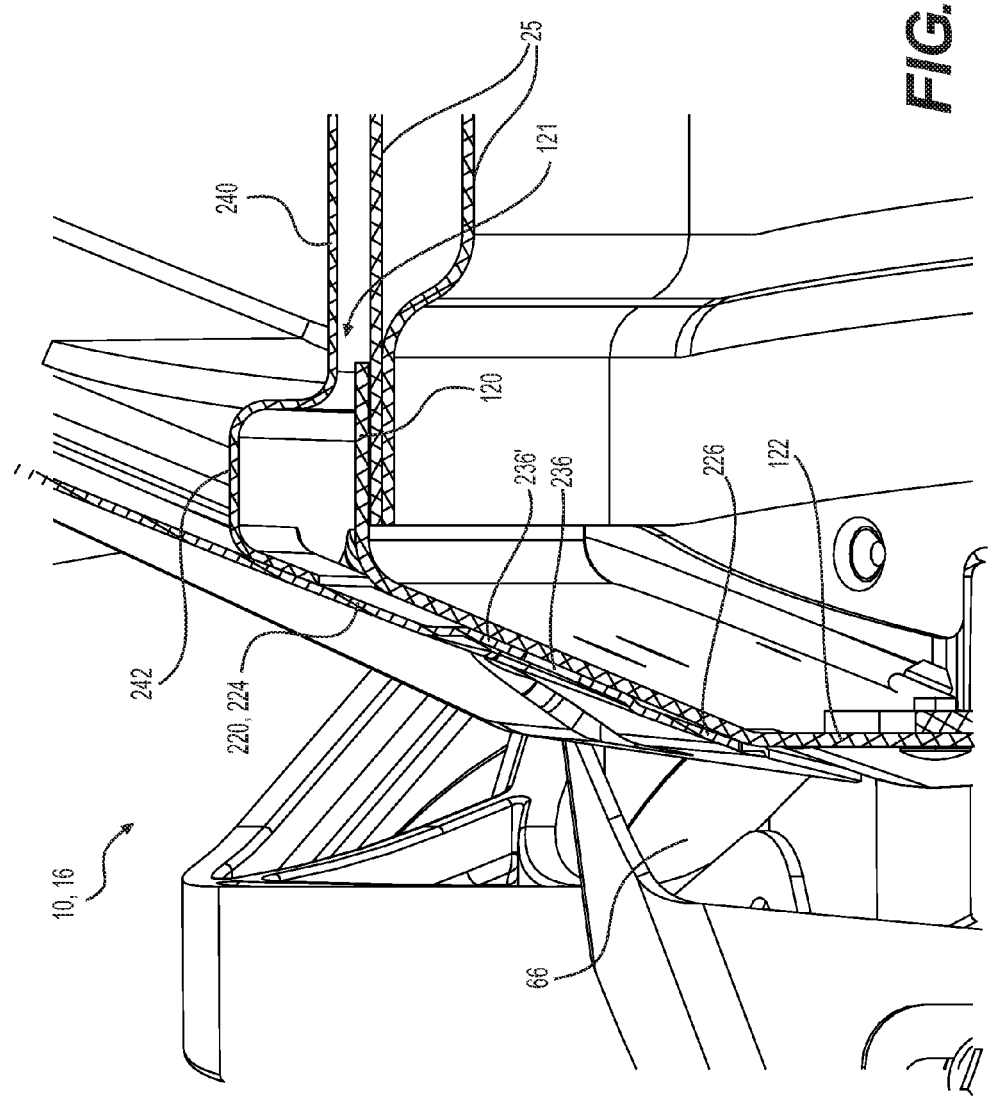

SNOWMOBILE FUEL TANK

CROSS-REFERENCE

The present application claims priority to U.S. Provisional Patent Application No. 62/043,966 filed on Aug. 29, 2014, the entirety of which is incorporated herein by reference.

TECHNICAL FIELD

The present technology relates to fuel tanks for snowmobiles.

BACKGROUND

Snowmobiles are designed for travel on groomed trails as well as off-trail areas, and for different uses such as recreational purposes or for carrying loads. It is therefore desirable to design snowmobile frames to be rugged so that they can withstand different kinds of compression and torsional forces experienced while driving on different terrains and under different conditions.

For improved fuel efficiency and for better handling of a snowmobile in different riding conditions, it is also desirable to reduce the weight of the frame.

SUMMARY

One object of the present is to ameliorate at least some of the inconveniences of the prior art.

According to one aspect of the present technology, there is provided a snowmobile including a frame, at least one ski, a front suspension assembly operatively connected to the frame and the at least one ski, a rear suspension assembly operatively connected to the frame, an endless track operatively connected to the rear suspension assembly, and an engine operatively connected to the frame and the endless track. The frame includes a tunnel extending longitudinally and defining a longitudinal centerplane for the vehicle. The rear suspension assembly is operatively connected to the tunnel. An engine cradle is connected to the tunnel and extends forwardly therefrom, the engine being supported at least in part by the engine cradle. A front suspension module is connected to the engine cradle and extends forwardly therefrom. The front suspension assembly is operatively connected to the front suspension module. A forward support is connected to at least one of the front suspension module and the engine cradle. The forward support extends rearwardly and upwardly from the one of the front suspension module and the engine cradle. A fuel tank includes a lower fuel tank wall and an upper fuel tank wall connected thereto to enclose a volume therebetween. The volume fluidly communicates with the engine. The volume has a portion extending upwardly and forwardly from the tunnel to the forward support. The fuel tank is removably connected to the tunnel and the forward support by the upper fuel tank wall, the upper fuel tank wall includes a left lower end portion connected to the tunnel on a left side of the longitudinal centerplane, a right lower end portion connected to the tunnel on a right side of the longitudinal centerplane, and an upper end portion connected to the forward support. The lower fuel tank wall is connected to the upper fuel tank wall above the left and right lower end portions and below the upper end portion. A force transmitted between the forward support and the tunnel via the fuel tank is thereby transmitted through the upper fuel tank wall without passing through the lower fuel tank wall.

In some implementations, the upper fuel tank wall includes a left side portion extending generally vertically and comprising the left lower end portion, a right side portion extending generally vertically and comprising the right lower end portion, and a central portion formed integrally with the left and right side portions. The left side portion extends generally upwardly from the left lower end portion to the central portion. The right side portion extends generally upwardly from the right lower end portion to the central portion. The central portion extends laterally between the left and right side portions.

In some implementations, the lower fuel tank wall extends generally horizontally from the left side portion to the right side portion of the upper fuel tank wall.

In some implementations, the left side portion has a left bend disposed along a left bend axis extending through the left lower end portion and the upper end portion. The right side portion has a right bend disposed along a right bend axis extending through the right lower end portion and the upper end portion.

In some implementations, the left bend extends from the upper end portion toward the left lower end portion, and the right bend extends from the upper end portion toward the right lower end portion.

In some implementations, the left bend extends from the left lower end portion toward the upper end portion, and the right bend extends from the right lower end portion toward the upper end portion.

In some implementations, the tunnel includes a top surface extending generally horizontally and comprising a left edge and a right edge. A left bevel surface extends downwardly and leftwardly from the left edge of the top surface. A left side surface extends downwardly from the left bevel surface. A right bevel surface extends downwardly and rightwardly from the right edge of the top surface. A right side surface extends downwardly from the right bevel surface. The left lower end portion of the upper fuel tank wall is disposed on the left bevel surface and connected thereto. The right lower end portion of the upper fuel tank wall is disposed on the right bevel surface and connected thereto.

In some implementations, at least a portion of the left bevel surface connected to the left lower end portion is planar, and at least a portion of the right bevel surface connected to the right lower end portion is planar.

In some implementations, a portion of the left side portion is planar and extends along the planar left bevel surface portion and continuously upwardly therefrom. A portion of the right side portion is planar and extends along the planar right bevel surface portion and continuously upwardly therefrom.

In some implementations, a fill opening is defined in the central portion of the upper tank wall and fluidly communicates with the volume.

In some implementations, the fill opening is defined in a portion of the central portion extending upwardly and forwardly toward the upper end portion.

In some implementations, a recess is formed by one of the upper and the lower fuel tank walls disposed opposite the fill opening and extending away therefrom. The recess is configured to accommodate a fuel nozzle inserted into the volume through the fill opening.

In some implementations, the recess is formed by the lower fuel tank wall.

In some implementations, at least one seat fastening member is connected to an outer surface of the upper fuel tank wall facing away from the lower fuel tank wall. A seat is disposed at least in part on the upper fuel tank wall and fastened to the fuel tank via the at least one seat fastening member.

In some implementations, at least one of the at least one seat fastening member is a hook.

In some implementations, a lip is formed around a periphery of the lower fuel tank wall, the lip connecting the lower fuel tank wall to the upper fuel tank wall.

In some implementations, the lower fuel tank wall is connected to the upper fuel tank wall by at a welding connection, a glued connection, or a fastener connection.

In some implementations, the lower fuel tank wall is spaced from the tunnel.

In some implementations, a vibration damper is disposed between the tunnel and the lower fuel tank wall.

In some implementations, the upper end portion connected to the forward support is reinforced.

In some implementations, each of the upper and lower fuel tank walls is formed by stamping or super plastic forming.

In some implementations, a fuel tank outlet opening is defined in one of the upper and lower fuel tank walls. The fuel tank outlet opening fluidly communicates with the volume and is connected to the engine to supply fuel thereto.

In some implementations, the fuel tank outlet opening is defined in the lower fuel tank wall.

In some implementations, a steering bracket is rotatably supporting a steering column extending therethrough, the steering bracket being directly connected to the upper end portion of the upper fuel tank wall and to the forward support.

In some implementations, the steering bracket is connected to a longitudinally and vertically extending surface of the fuel tank.

In some implementations, a fill opening is defined in the upper tank wall and fluidly communicates with the volume. The steering bracket is connected to the upper end portion longitudinally forward of the fill opening.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, should be understood as they would be understood when these components or sub-assemblies are mounted to the vehicle. Definitions provided herein take precedence over definitions of the same term in the document incorporated herein by reference.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 14A is a perspective view, taken from a bottom, front and left side, of a seat base of the seat of the snowmobile of FIG. 1;

FIG. 15 is an enlarged cross-sectional view of a left side portion of the frame of the snowmobile of FIG. 1, taken along the line 15-15 of FIG. 2 and showing the left side of the fuel tank and the left side of the tunnel;

FIG. 16B is a close-up of the cross-sectional view of the left side portion frame of the snowmobile of FIG. 16A, showing the connection between the left side of the fuel tank and the left side of the tunnel.

DETAILED DESCRIPTION

Figure 1:
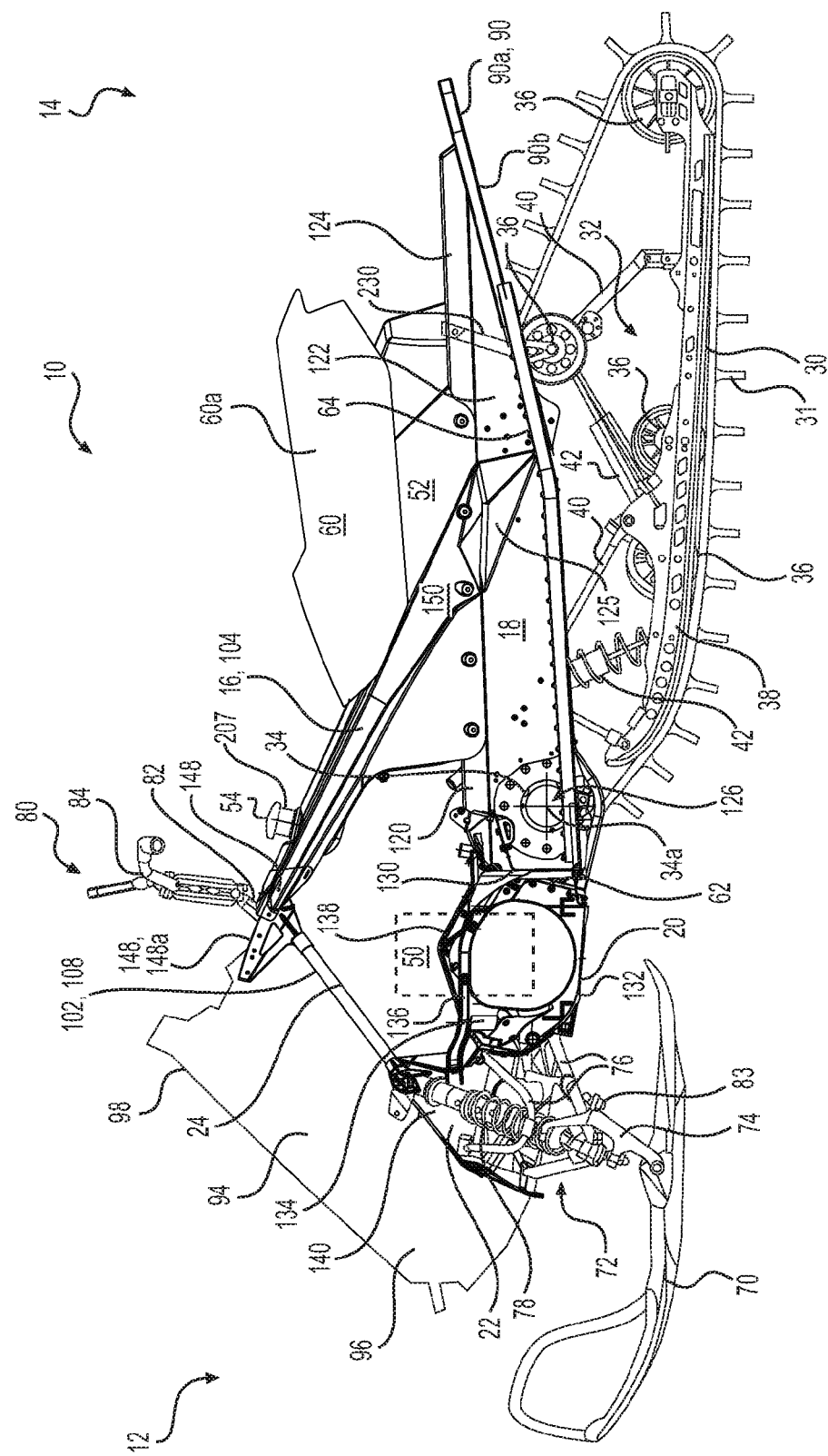
FIG. 1 is a partially cut-away left side elevation view of a portion of a snowmobile.

Referring to FIG. 1, a snowmobile 10 includes a forward end 12 and a rearward end 14 which are defined consistently with a travel direction of the vehicle 10. The snowmobile 10 includes a vehicle body in the form of a frame or chassis 16 which includes a rear tunnel 18, an engine cradle 20, a front suspension module 22 and an upper support structure 24. The tunnel 18 defines a longitudinal centerplane 13 (longitudinally disposed vertical plane, FIG. 3) of the snowmobile 10. The frame 16 will be described in further detail below.

An internal combustion engine 50 (shown schematically in FIG. 1) is carried in an engine compartment defined by the engine cradle 20. A fuel tank 52, supported above the tunnel 18, supplies fuel to the engine 50 for its operation. The fuel tank 52, which forms part of the upper structure 24 of the frame 16, will be described below in further detail. Coolant used to cool the engine 50 is circulated through heat exchangers 25 (FIG. 2A) mounted to the tunnel 18.

An endless drive track 30 is positioned at the rear end 14 of the snowmobile 10. The drive track 30 is disposed generally under the tunnel 18, and is operatively connected to the engine 50 through a belt transmission system (not shown) and a reduction drive (not shown). The endless drive track 30 is driven to run about a rear suspension assembly 32 connected to the tunnel 18 for propulsion of the snowmobile 10. The endless drive track 30 has a plurality of lugs 31 extending from an outer surface thereof to provide traction to the track 30.

The rear suspension assembly 32 includes a drive sprocket 34, one or more idler wheels 36 and a pair of slide rails 38 in sliding contact with the endless drive track 30. The drive sprocket 34 (shown schematically in FIG. 1) is mounted on a drive axle 35 and defines a sprocket axis 34a. The slide rails 38 are attached to the tunnel 18 by front and rear suspension arms 40 and one or more shock absorbers 42 which include a coil spring (not indicated) surrounding the individual shock absorbers 42. It is contemplated that the snowmobile 10 could be provided with a different implementation of a rear suspension assembly 32 than the one shown herein.

At the rear end of the snowmobile 10, a rear bumper 90, in the form of a U-shaped tubular structure, is connected to the rear end of the tunnel 18 and extends rearwardly therefrom.

A straddle-type seat 60 is positioned atop the fuel tank 52. A fill opening 206 (FIG. 3) of the fuel tank 52, covered by a cap 54, is disposed on the upper surface of the fuel tank 52 in front of the seat 60. It is contemplated that the fill opening 206 could be disposed elsewhere on the fuel tank 52. The seat 60 is adapted to accommodate a driver of the snowmobile 10. The seat 60 can also be configured to accommodate a passenger. A footrest 64, in the form of a footboard, is positioned on each side of the snowmobile 10 below the seat 60 to accommodate the driver's feet.

Two skis 70 positioned at the forward end 12 of the snowmobile 10 are each attached to the front suspension module 22 of the frame 16 through a corresponding front suspension assembly 72. The front suspension module 22 is connected to the front end of the engine cradle 24. Each front suspension assembly 72 includes a ski leg 74, supporting arms 76, shock absorbers 78 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods 83 (the left end of the left steering rod 83 can be seen in FIG. 1). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a thumb-actuated throttle lever is mounted to the right side of the handlebar 84. Other types of throttle operators, such as a finger-actuated throttle lever are also contemplated. A brake actuator (not indicated), in the form of a hand brake lever, is provided on the left side of the handlebar 84 for braking the snowmobile 10 in a known manner.

At the front end 12 of the snowmobile 10, fairings 94 enclose the engine 50 and the belt transmission system, thereby providing an external shell that not only protects the engine 50 and the transmission system, but can also be decorated to make the snowmobile 10 more aesthetically pleasing. The fairings 94 include a hood 96 and one or more side panels which can be opened to allow access to the engine 50 and the belt transmission system when this is required, for example, for inspection or maintenance of the engine 50 and/or the transmission system. A windshield 98 connected to the fairings 94 acts as a wind screen to lessen the force of the air on the rider while the snowmobile 10 is moving. The windshield 98 may be connected directly to the handlebar 84.

The snowmobile 10 includes other components such as a display cluster, an exhaust system, an air intake system, and the like. As it is believed that these components would be readily recognized by one of ordinary skill in the art, further explanation and description of these components will not be provided herein.

The frame 16 will now be described in more detail with reference to FIGS. 2 to 4. As previously mentioned, the frame 16 of the snowmobile 10 includes the tunnel 18, the engine cradle 20, the front suspension module 22, and the upper structure 24 which includes the fuel tank 52.

The tunnel 18 generally forms an inverted U-shaped structure when viewed from the front or back. With reference to FIGS. 2 to 4, the tunnel 18 includes a top surface 120 extending generally horizontally, a left side surface 122 extending generally vertically and a right side surface 122 extending generally vertically. A left bevel surface 124 connects the left edge of the top surface 120 to the upper edge of the left side surface 122. A right bevel surface 124 connects the right edge of the top surface 120 to the upper edge of the right side surface 122. Each bevel surface 124 is planar and extends downwardly and laterally outwardly from the horizontal top surface 120 to the corresponding vertical side surface 122. Each bevel surface 124 forms an obtuse angle with the horizontal top surface 120. Each bevel surface 124 also forms an obtuse angle with the corresponding vertical side surface 122. Each bevel surface 124 allows for connection of a corresponding side portion 224 of the fuel tank 52 as will be described further below. A portion 125 of the tunnel 18 connected to the corresponding side tunnel surface 122 just below the bevel surface 124 helps to reduce noise and vibrations caused by the tunnel 18. It is contemplated that the portion 125 could also be used to support the fuel tank 52.

Figure 2:
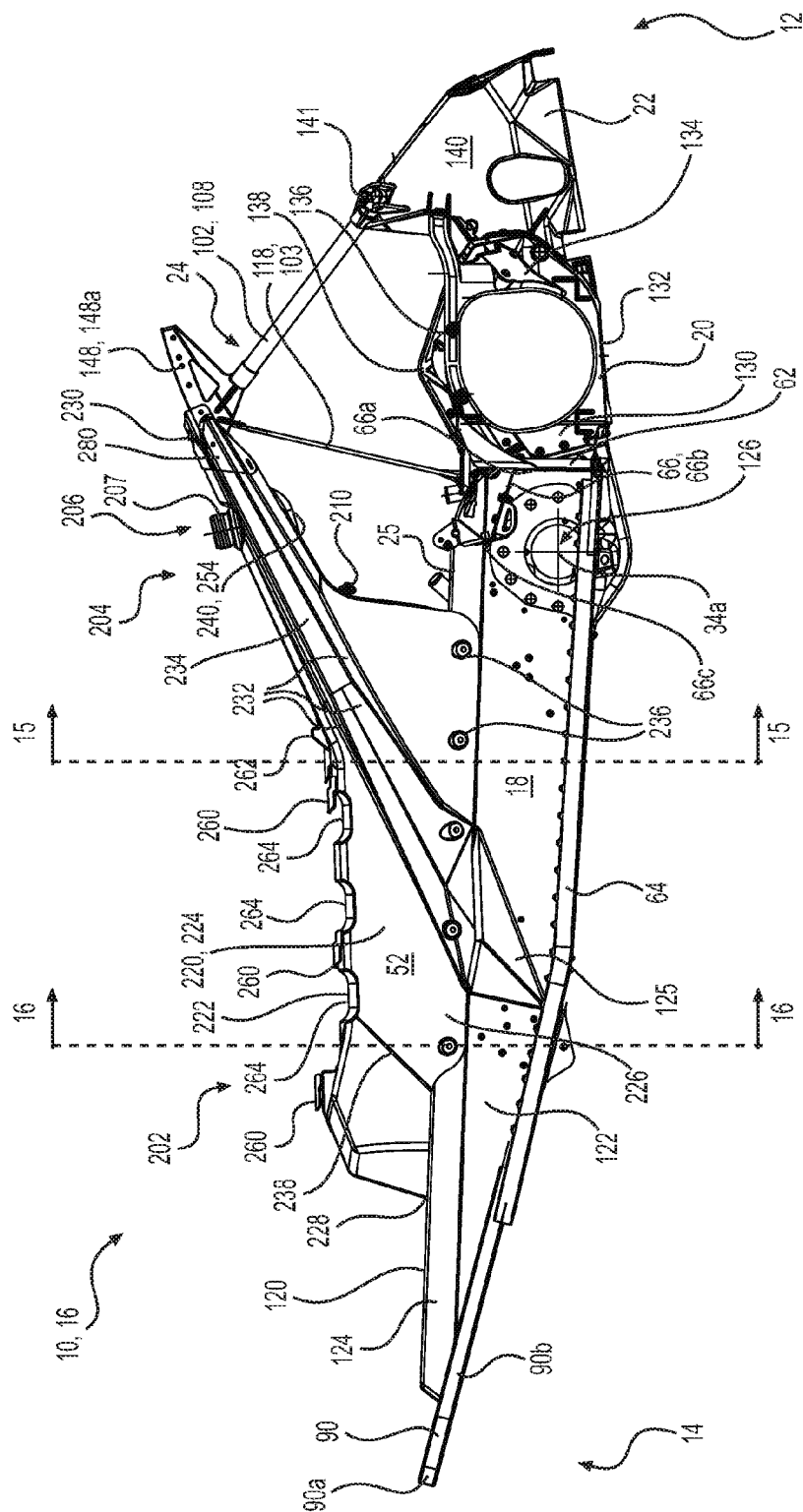
FIG. 2 is a right side elevation view of the frame of the snowmobile of FIG. 1.

As best seen in FIG. 2, when viewed from a lateral side, the top surface 120 slopes gently upwardly from the front to the rear of the tunnel 18 when the snowmobile 10, without any load (cargo or riders), is at rest on a horizontal surface. It is contemplated that the entire length of the top surface 120 could be horizontal, or that there could be more than one slope along the length of the tunnel 18. It is also contemplated that a portion of the top surface 120 could be curved in a lateral or longitudinal direction. With reference to FIG. 3, the top surface 120 has a rectangular gap 121 extending longitudinally along the centerplane 13. The gap 121 extends from the rear end of the tunnel 18 towards the front end of the tunnel 18. It is contemplated that the gap 121 could be shaped and sized differently than as shown. The heat exchanger 25 is disposed in the gap 121 of the top surface 120. The coolant flowing through the heat exchanger 25 is cooled by cool air flowing along the surfaces of the heat exchanger 25 disposed in the gap 121 and the snow being thrown upwards onto the lower surface of the heat exchanger 25 by the turning track 40 disposed below the tunnel 18.

Figure 3:
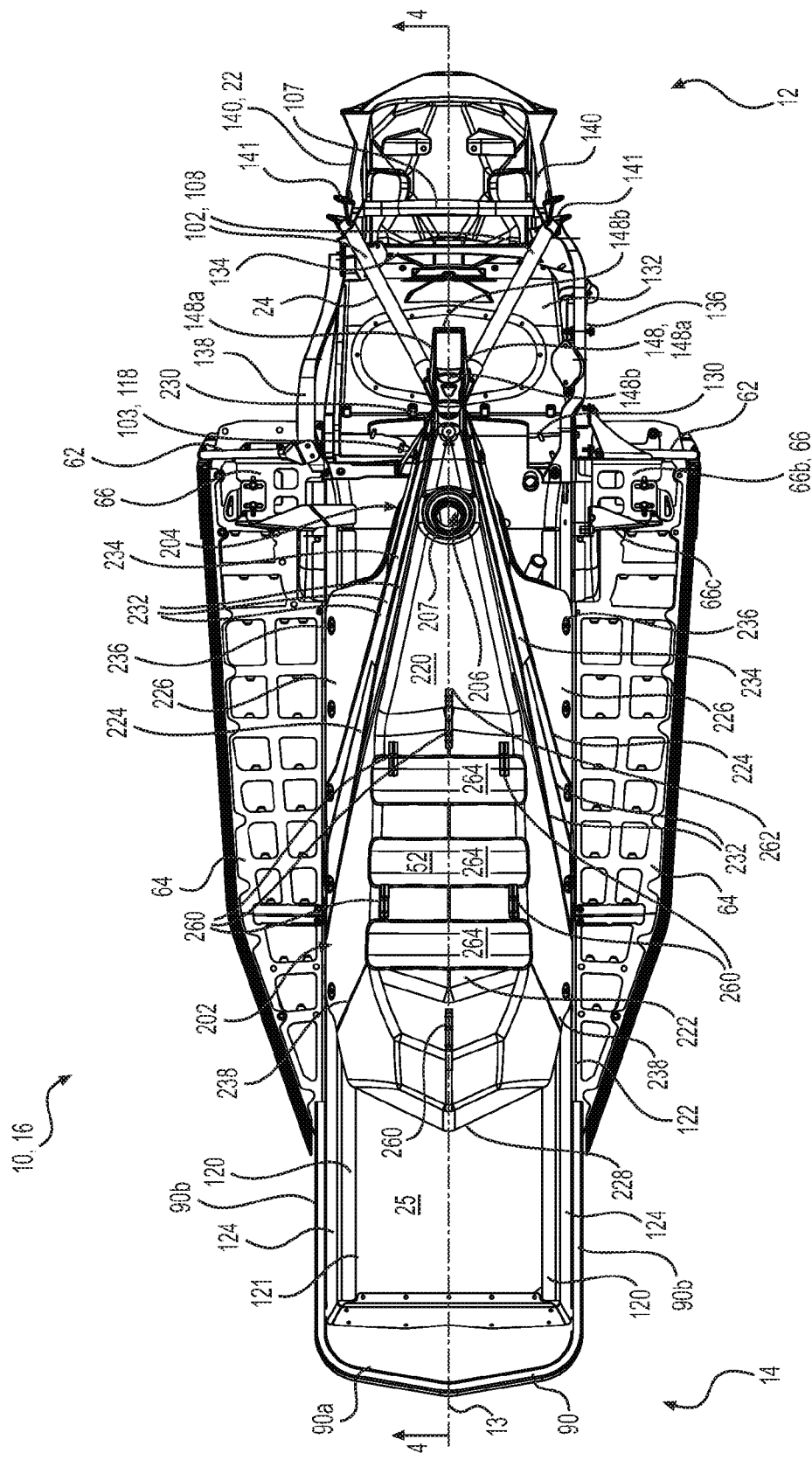
FIG. 3 is a top plan view of the frame of the snowmobile of FIG. 2.
Figure 4:
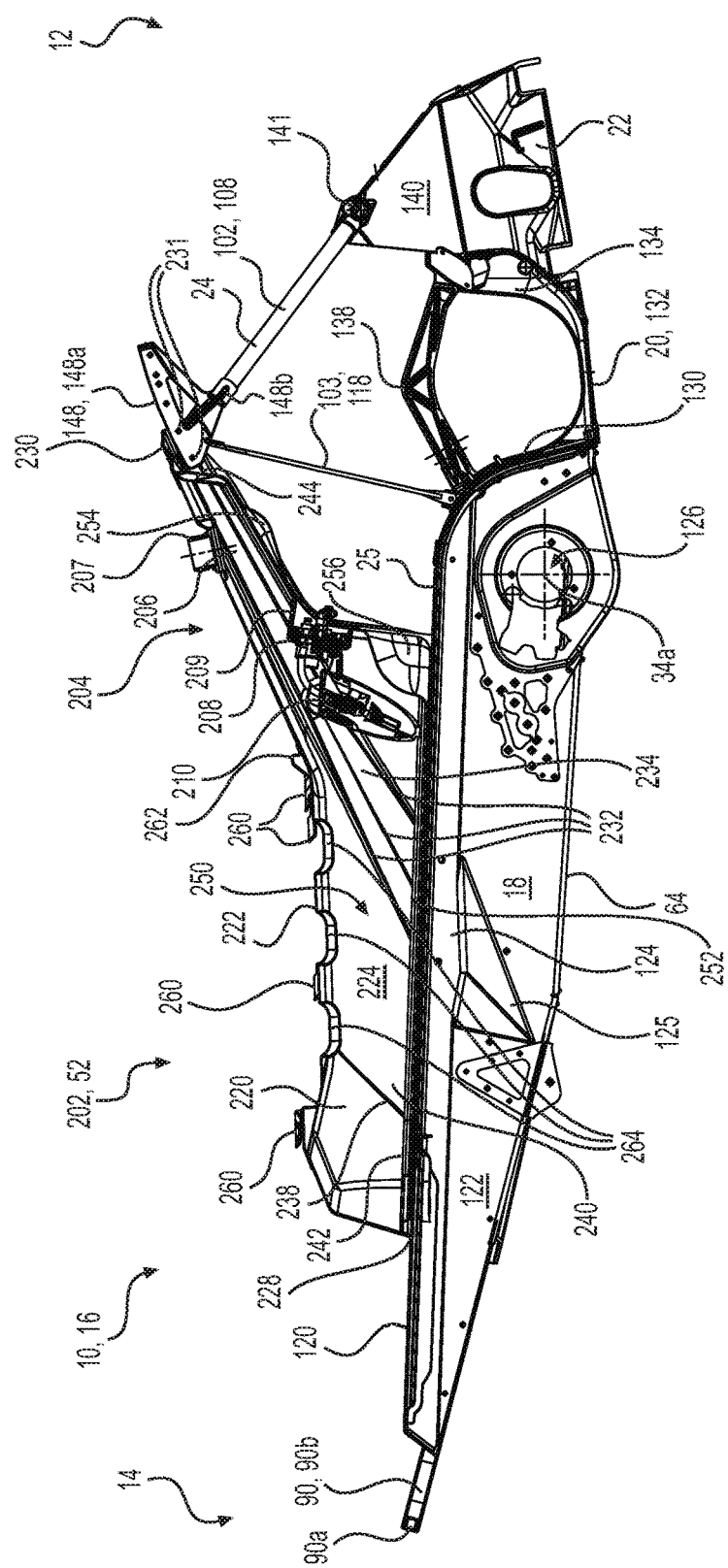
FIG. 4 is a cross-sectional view of the frame of the snowmobile taken along the line 4-4 of FIG. 3.

With reference to FIGS. 2 to 4, a central arm 90a of the bumper 90 is disposed rearward of the rear end tunnel 18 and generally aligned with the top tunnel surface 120. A left end of the central arm 90a is connected to a downwardly and forwardly extending left arm 90b and its right end connected to a downwardly and forwardly extending right arm 90b. The left arm 90b extends downwardly and forwardly to the bottom edge of the left tunnel surface 122 and then along the bottom edge of the left tunnel surface 122. The front end of the left arm 90*b* is disposed forward of the rear end of the left footrest 64. The right arm 90*b* similarly extends downwardly and forwardly to the bottom edge of the right tunnel surface 122 and therealong. The front end of the right arm 90*b* is disposed forward of the rear end of the right footrest 64. It is contemplated that the bumper 90 could be shaped differently than as shown herein.

With reference to FIGS. 2 and 4, each of the left and right side surfaces 122 of the tunnel 18 has an opening 126 which receives the front drive axle (not shown). The front portion of the left side surface 122 around the opening 126 is reinforced for additional rigidity, as can be seen when viewed from a lateral side. The left footrest 64 extends leftwardly from the bottom edge of the left side surface 122, and the right footrest 64 extends rightwardly from the bottom edge of the right side surface 122. Each footrest 64 is formed integrally with the corresponding one of the tunnel side surfaces 122. A toehold 66 extends upward from the front edge of each footrest 64. Each of the left and right toeholds 66 has a generally vertical front portion 66*a* that extends upwardly from the front edge of the footrest 64, a generally horizontal middle portion 66*b* that extends rearwardly from the top of the front portion 66*a* and a rear portion 66*c* that extends upwardly from the rear end of the middle portion 66*b*. A footrest support 62 connects the front end of each footrest 64 to a rear portion 130 of the engine cradle 20.

With reference to FIGS. 2 to 4, the engine cradle 20 is attached to the front end of the tunnel 18 and extends forwardly therefrom. In the illustrated implementation of the engine cradle 20, the rear portion 130 of the engine cradle 20 extends generally vertically and is connected to the front of the tunnel 18. A generally horizontal bottom portion 132 of the engine cradle 20 extends forwardly from the bottom of the rear portion 130, and a generally vertical front portion 134 rises upwards from the bottom portion 132 of the engine cradle 20. The engine 50 is supported by the engine cradle 20 in a manner which would be determined by the size and shape of the engine 50. Engine cradles having different shapes and including components different than as described above are also contemplated. The engine 50 can be supported on the bottom portion 132 of the engine cradle 20 or can also be solely and/or simultaneously supported by other areas of the engine cradle 20, tunnel 18 and/or front suspension module 22. On the right side of the engine cradle 20, as best seen in FIGS. 2 and 3, a generally horizontal upper bar 136 extends between the upper ends of the front and rear portions 134, 130 of the engine cradle 20. The right upper bar 136 is spaced from the generally horizontal bottom portion 132 in order to provide additional structural rigidity to the engine cradle 20. In the illustrated implementation, a left upper bar 138 is also provided on the left side of the engine cradle 20, connecting between the upper ends of the front and rear portions 134, 130 of the engine cradle 20 and being spaced from the bottom portion 132. In the illustrated implementation, the bars 136, 138 are removably mounted to the front and rear portions 134, 130. It is contemplated that one or both of the upper bars 136, 138, could be omitted, or configured differently than as shown.

With reference to FIGS. 2 to 4, the front suspension module 22, which attaches the front suspension assembly 16 to the snowmobile 10, is attached to the front portion 134 of the engine cradle 20. The front suspension module 22 extends forwardly from the engine cradle 20. The front suspension module 22 includes left and right front suspension mounting brackets 140. Each bracket 140 forms an inverted generally V-shaped structure extending forwardly from the front portion 134 of the engine cradle 20. Each front suspension mounting bracket 140 has the corresponding front suspension assembly 72 attached thereto. Other types of suspension mounting brackets are also contemplated to accommodate different types of front suspension assemblies 72. The front suspension module 22 and the engine cradle 20 also support a portion of an exhaust system (not shown) connected to the engine 50.

With reference to FIGS. 2 to 4, the upper support structure 24 includes an upper forward support 102, an upper column 103, and the fuel tank 52. The upper forward support 102 includes left and right forward support braces 108. The lower end of each of the left and right forward support braces 108 is attached to the corresponding one of the left and right front suspension mounting bracket 140 at the upper end thereof (apex of the inverted V-shaped bracket 140). A laterally extending frame member 107 connects between the lower ends of the two forward support braces 108. The frame member 107 is also connected to the top of the front suspension mounting brackets 140. The apex of the left mounting bracket 140, the left end of the frame member 107 and the bottom end of the left forward support brace 108 are connected together at a common connection point 141 on the left side. Similarly, the apex of the right mounting bracket 140, the right end of the frame member 107 and the bottom end of the right forward support brace 108 are connected together at a common connection point 141 on the right side. Each forward support brace 108 extends upwards, rearwards and laterally inwards to an upper end. A steering bracket 148 positioned above the engine cradle 20 is connected to the upper ends of the forward support braces 108. The steering bracket 148 is formed of a pair of laterally spaced plates 148*a* and two lateral connectors 148*b* extending therebetween. Each of the plates 148*a* extends vertically and longitudinally and has a triangular shape when viewed from a lateral side. The bottom end of each steering bracket plate 148*a* is connected to the upper end of the corresponding forward support brace 108. The steering column 82 is rotatably inserted through the steering bracket 148 between the braces 108. The steering column 82 extends downwards and forwards from the handlebar 84 through the steering bracket 148 to the front suspension assembly 72 (connection not shown in figures) for rotating the skis 70 and steering the snowmobile 10. It is contemplated that the steering bracket 148 could extend further outwards in the lateral direction than as shown in the figures. The forward support braces 108 are formed as extruded hollow tubes made of metal or other suitably strong materials, however, the disclosure is not intended to be limited to this particular material, assembly method or configuration. For example, it is contemplated that the forward support braces 108 could have a different cross-section or be made by molding or casting. It is also contemplated that the forward support braces 108 may be constructed according to a monocoque or pseudo-monocoque technique instead of having a tubular construction as in the illustrated implementation.

With reference to FIGS. 2 to 4, an upper column 103 extends upwards from the engine cradle 20 to support the steering bracket 148. The upper column 103 includes a left leg 118 which extends upwardly, forwardly and laterally inwardly from the engine cradle portion 130. The left steering bracket plate 148*a* is connected to the upper end of the left leg 118 rearward of the connection of the steering bracket plate 148*a* to the left forward support brace 108. It is contemplated that the upper column 103 could include a right upper column leg connecting the right steering bracket plate 148a to the engine cradle 20. It is also contemplated that the upper column leg 118 could be connected to the left forward support brace 108 instead of the steering bracket 148. In the illustrated implementation, the left upper column leg 118 is in the form of a straight, tubular rod, but it is contemplated that the legs 118 could also have a bend or a curve. For example, the leg 118 could extend upwardly from the engine cradle 20 and then bend laterally inwardly to the steering bracket 148. It is also contemplated that the leg 118 could not be tubular. For example, the leg 118 could be in the form of a solid rod. It is further contemplated that the upper column 103 could be constructed as a single inverted U-shaped structure having two legs 118.

The fuel tank 52 is mounted on the top surface 120 of the tunnel 18 and is rigidly secured thereto as will be discussed below. The fuel tank 52 extends upwards and forwards from the tunnel 18 to connect to the steering bracket 148 and thereby to the forward support braces 108. The fuel tank 52 is also rigidly secured the steering bracket 148. This configuration of the frame 16 in which the fuel tank 52 connects the tunnel 18 to the upper forward support 102 enhances the torsional and structural rigidity of the frame 16 by enabling transfer of torques and forces from the upper forward support 102 to the tunnel 18 via the fuel tank 52. The fuel tank 52 is secured removably to the steering bracket 148 and tunnel 18 in order to allow removal of the fuel tank 52 for maintenance, repairs, and/or replacement.

With reference to FIGS. 1 to 3, a pyramidal structure is formed by the cooperating components of the frame 16, namely the fuel tank 52, the forward supports braces 108, the tunnel 18, engine cradle 20 and the front suspension module 22. The contact area between the fuel tank 52 and the tunnel 18 is larger than the contact area between the fuel tank 52 and the forward support braces 108. The fuel tank 52 tapers in width as it rise upwards from the tunnel 18 toward the steering bracket 148 and the forward support braces 108. This pyramidal structure increases the torsional rigidity of the frame 16 about axes perpendicular to the front drive axle axis 34a, compared to some snowmobile frames without a pyramidal structure. With reference to FIG. 2, when viewed from a lateral side, the cooperation between the forward supports braces 108, the fuel tank 52, the tunnel 18, engine cradle 20 and the front suspension module 22 forms a generally triangular structure which increases the resistance to bending along axes parallel to the front drive axle axis 34a.

The fuel tank 52 will now be described in further detail with reference to FIGS. 2 to 15.

With reference to FIGS. 2 and 4, the fuel tank 52 has a rear portion 202 extending along the top surface 120 of the tunnel 18, and a neck portion 204 extending upwardly and forwardly from the lower portion 202 to an upper end portion 230 connected to the steering bracket 148. As can be seen in FIG. 3 the fuel tank 52 has a generally oblong shape when viewed from the top. When viewed from the front (FIG. 10) or rear (FIG. 11), the fuel tank 52 has a generally triangular shape.

Figure 12:
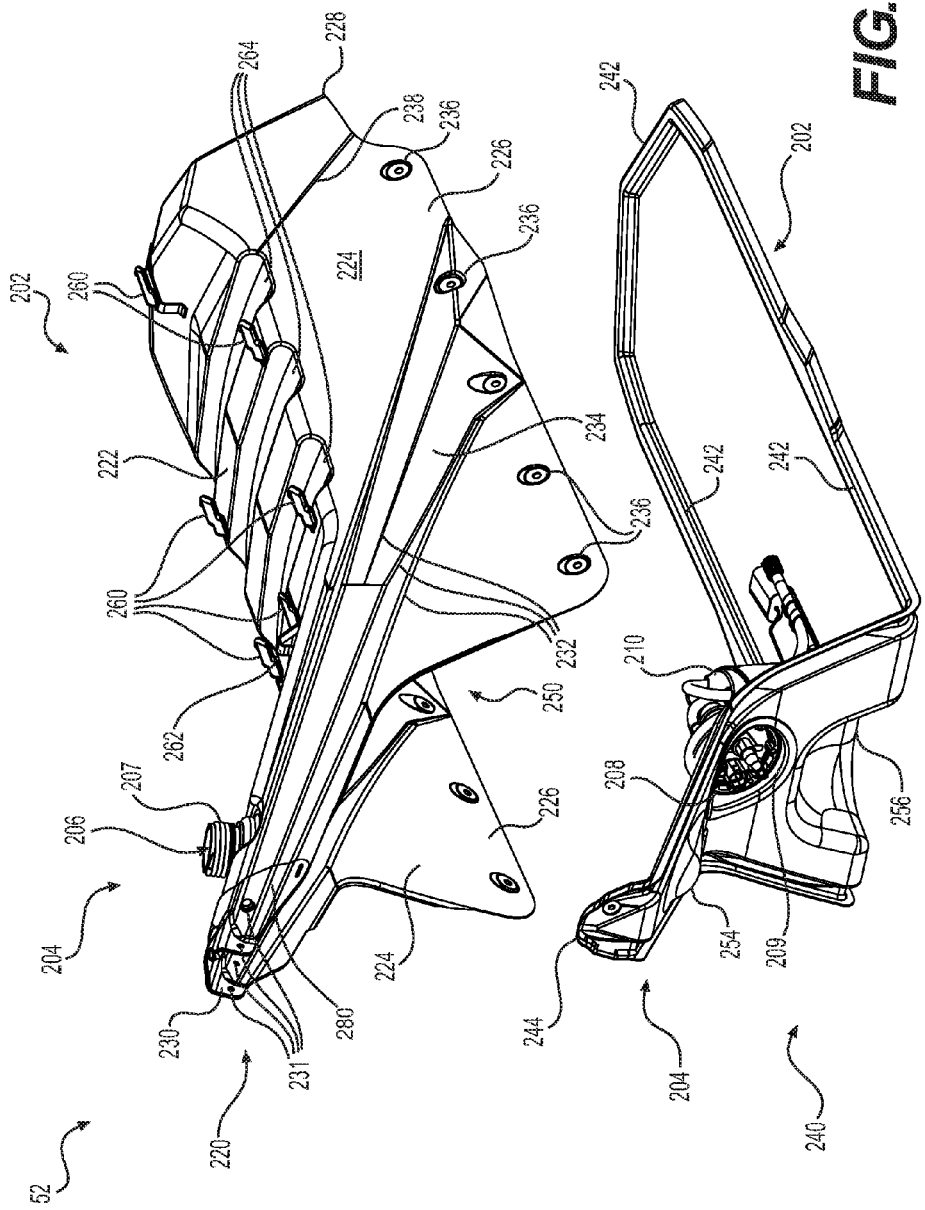
FIG. 12 is an exploded perspective view, taken from a front, left side, of the fuel tank of FIG. 5.
Figure 13:
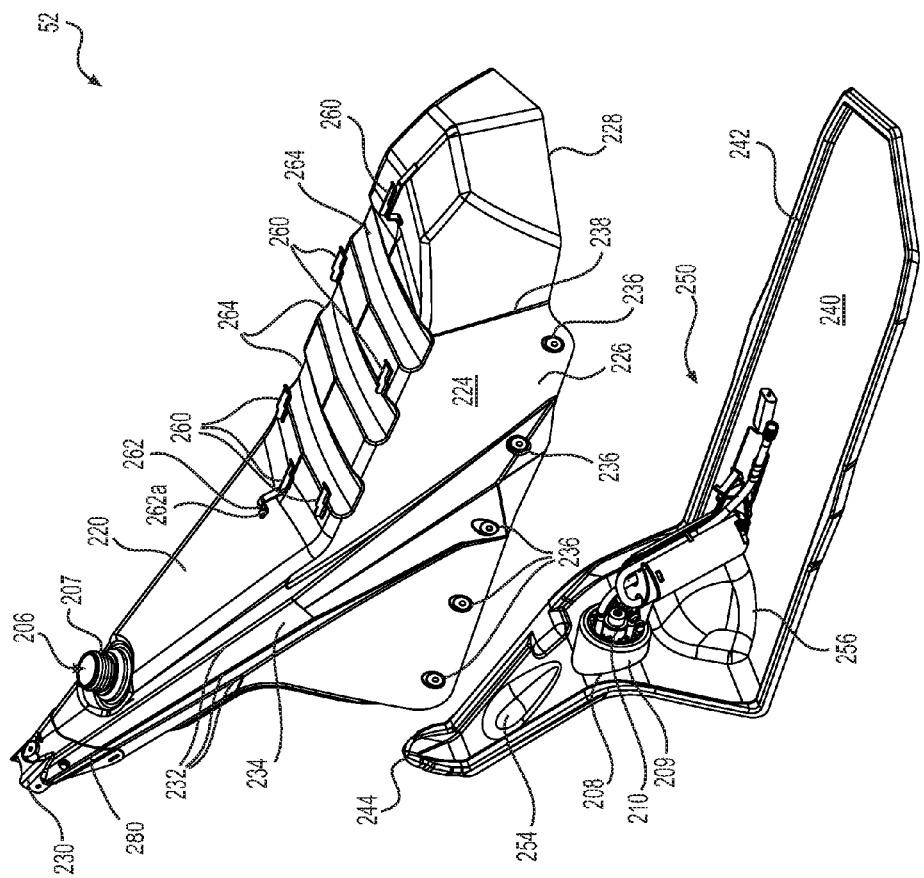
FIG. 13 is an exploded perspective view, taken from a rear, left side, of the fuel tank of FIG. 5.

With reference to FIGS. 12, 13 and 15, the fuel tank 52 is formed by an upper wall 220 and a lower wall 240 as will be described below. The fuel tank 52 is connected to the tunnel 18 and the steering bracket 148 via the upper wall 220. With reference to FIGS. 2 to 4, the upper end portion 230 of the fuel tank 52 extends longitudinally forward of the upper column leg 118 and is connected to the steering bracket 148. A left lower end portion 226 of the fuel tank 52 is connected to the left bevel surface 124 of the tunnel 18 and a right lower end portion 226 is connected to the right bevel surface 124 of the tunnel 18.

With reference to FIGS. 5 to 12, the upper wall 220 of the fuel tank 52 has an upper wall central portion 222, an upper wall left side portion 224, and an upper wall right side portion 224. The upper wall central portion 222 extends laterally from the upper wall left side portion 224 to the upper wall right side portion 224. The upper wall left side portion 224 extends generally downwardly and leftwardly from the left side of the upper wall central portion 222. The upper wall right side portion 224 extends generally downwardly and rightwardly from the right side of the upper wall central portion 222. The left side portion 224 includes the left lower end portion 226 and the right side portion 224 includes the right lower end portion 226. The upper end portion 230 of the upper wall 220 is formed by the central portion 222, as well as the left and right side portions 224.

Figure 5:
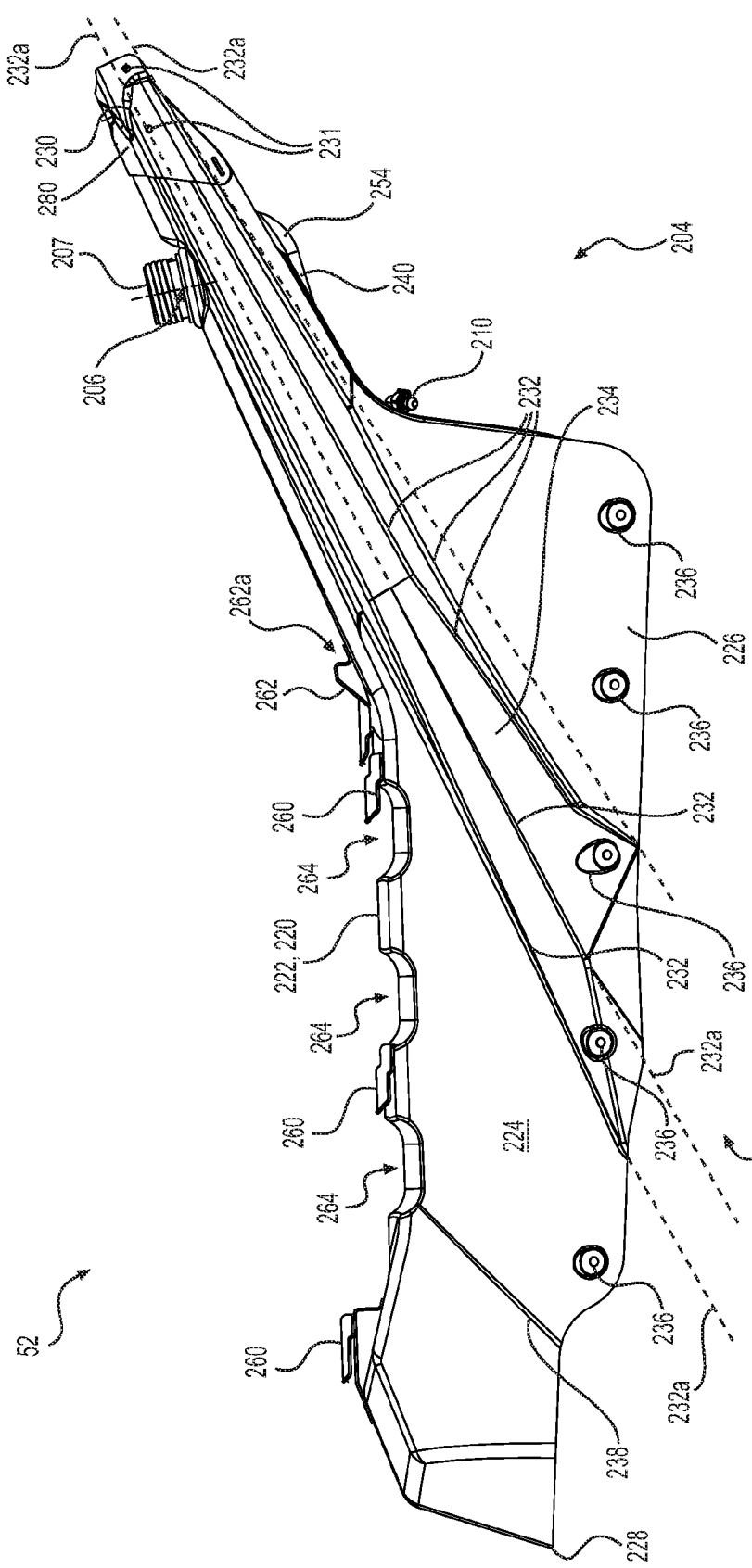
FIG. 5 is a right side elevation view of the fuel tank of the snowmobile of FIG. 1 shown in isolation.
Figure 6:
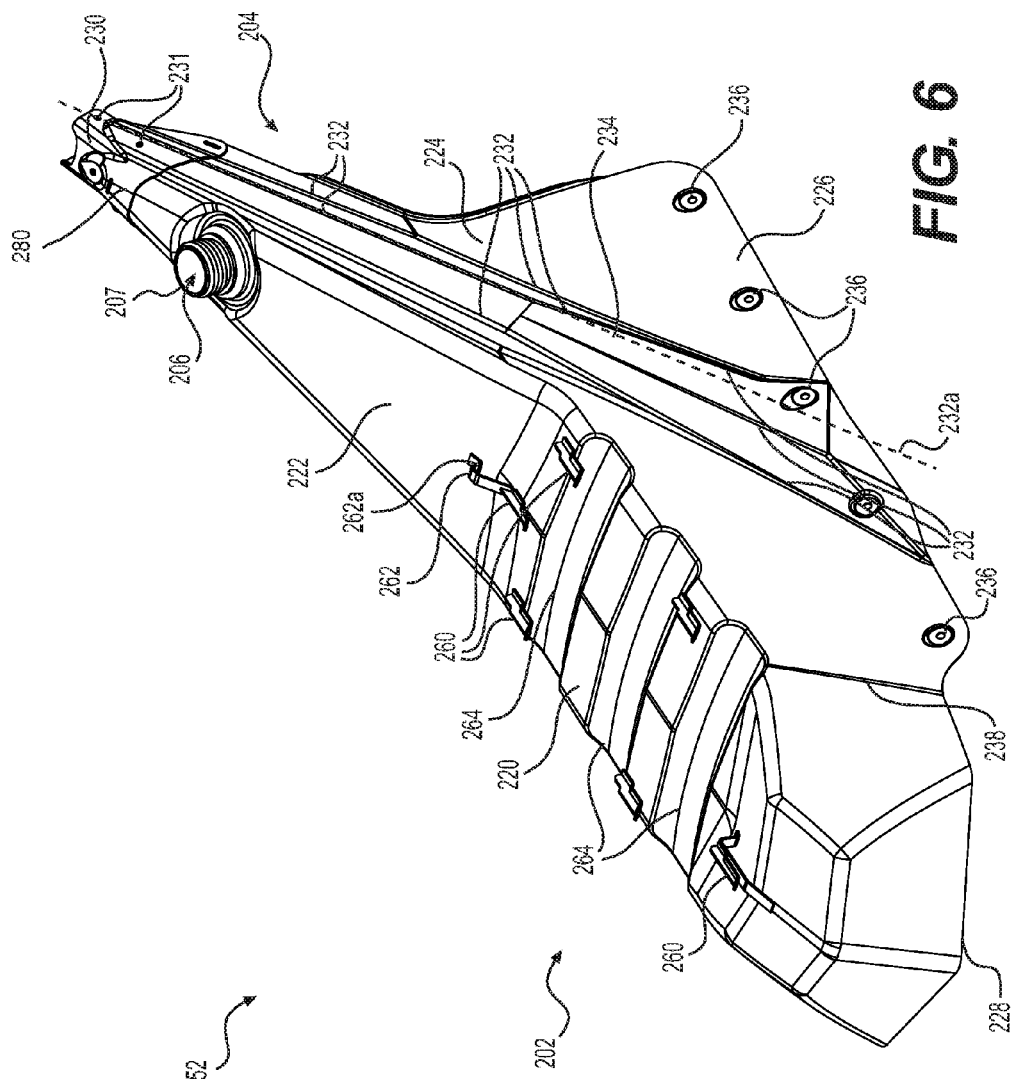
FIG. 6 is a perspective view, taken from a rear, top and right side, of the fuel tank of FIG. 5.

With reference to FIGS. 5 to 12, the upper wall central portion 222 extends generally horizontally in the rear portion 202 of the fuel tank 52 except at the rear end where it extends generally vertically downwardly to a rear edge 228. The rear edge 228 of the upper wall 220 is disposed above the heat exchanger 25 and is generally aligned with the rear end of the footrest 64 in the longitudinal direction. The upper wall central portion 222 extends forwardly and upwardly to form the neck portion 204 and the upper end portion 230. The width of the upper wall central portion 222 in the neck portion 204 tapers towards the upper end portion 230 as can be seen in FIG. 6.

With reference to FIGS. 2 to 6, the fill opening 206 is defined in the upper wall central portion 222 forming the neck portion of the fuel tank 52. A cylindrical fill tube 207 is connected to the fill opening 206 and extends upwardly and rearwardly from the rearwardly and upwardly facing surface of the central portion 222. The open end of the fill tube 207 is selectively sealed by a removable cap 54 (FIG. 1). In the illustrated implementation, the open end of the fill tube 207 and the cap 54 are threaded, and the open end of the fill tube 207 is sealed by screwing the cap 54 thereon. It is contemplated that the fill tube 207 and the cap 54 could be configured differently. For example, the cap 54 could be latched, or otherwise locked, to the open end of the fill tube 207 for sealing the fill tube 207. The fill tube 207 is disposed longitudinally forward of the seat 60. The fill tube 207 is disposed above the drive sprocket 34 so as to have a longitudinal position between the front and rear edges of the drive sprocket 34 as can be seen in FIG. 1. The fill tube 207 is longitudinally forward of the rotational axis 34a of the drive axle. The fill tube 207 is rearward of the footrest support 62. It is contemplated that the fill opening 206 could be formed elsewhere on the neck portion 204 of the fuel tank 52.

Figure 10:
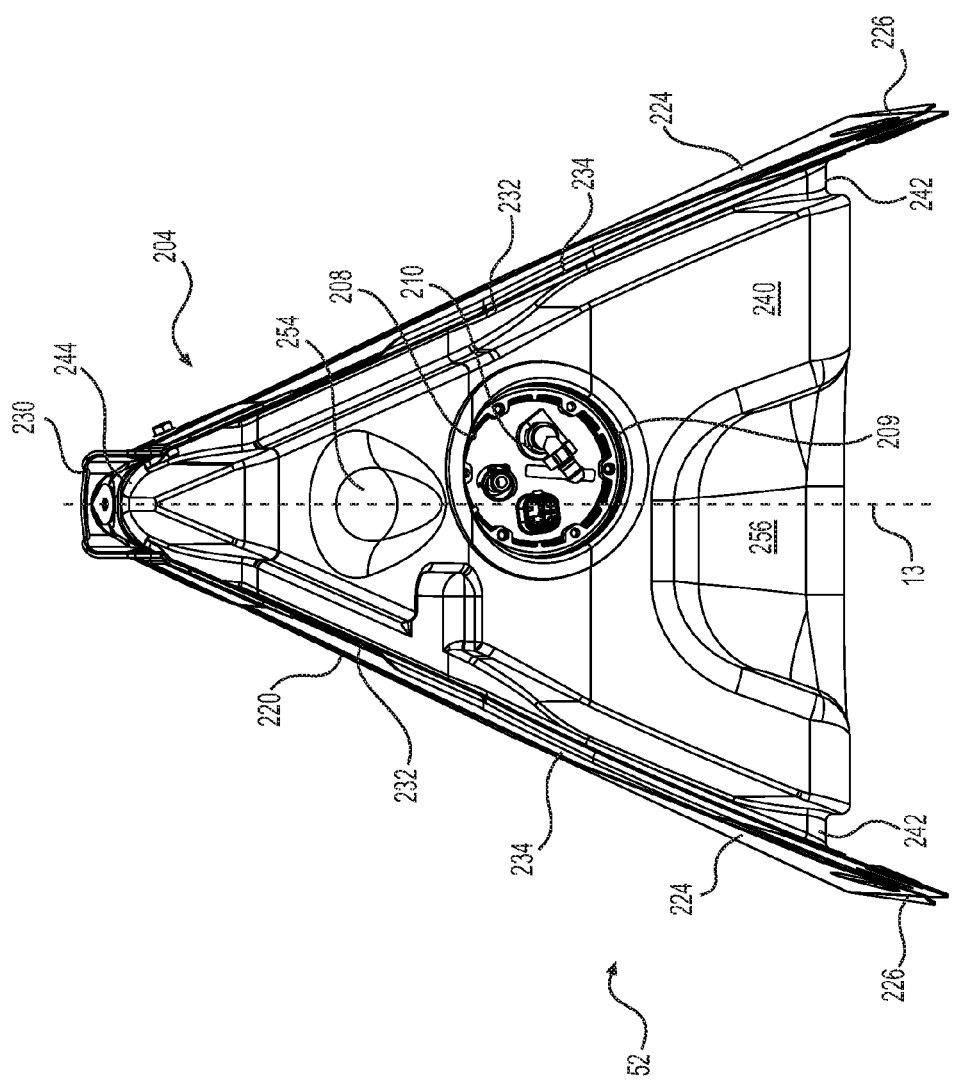
FIG. 10 is a front elevation view of the fuel tank of FIG. 5.
Figure 11:
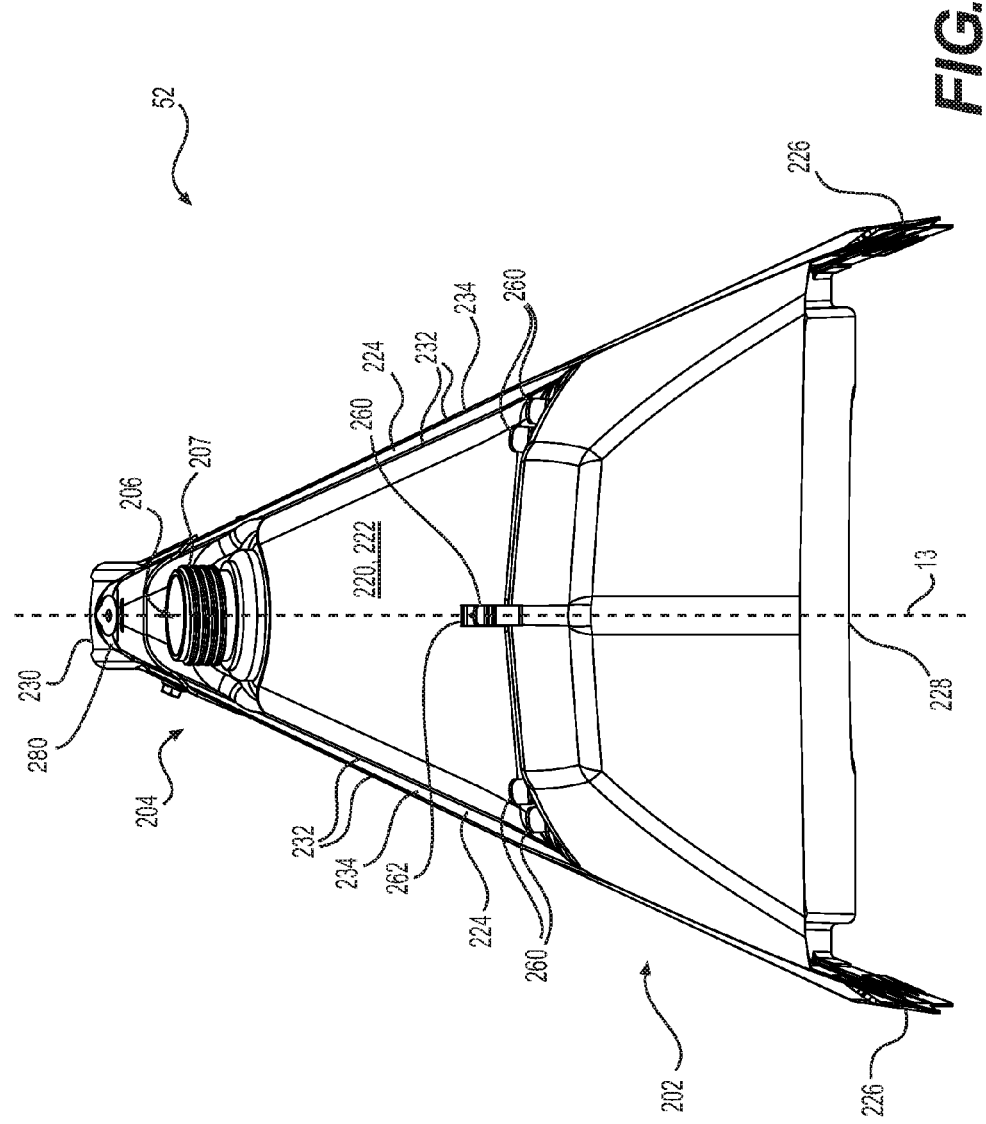
FIG. 11 is a rear elevation view of the fuel tank of FIG. 5.

With reference to FIGS. 10 and 11, the upper wall left side portion 224 extends forwardly, rightwardly and upwardly from the left lower end portion 226 to the left side of the upper end portion 230. Similarly, the upper wall right side portion 224 extends forwardly, leftwardly and upwardly from the right lower end portion 226 to the right side of the upper end portion 230. When viewed from the front or the rear, each of the upper wall side portions 224 extends at generally the same angle with respect to the vertical in the fuel tank rear portion 202 as in the fuel tank neck portion 204.

Figure 8:
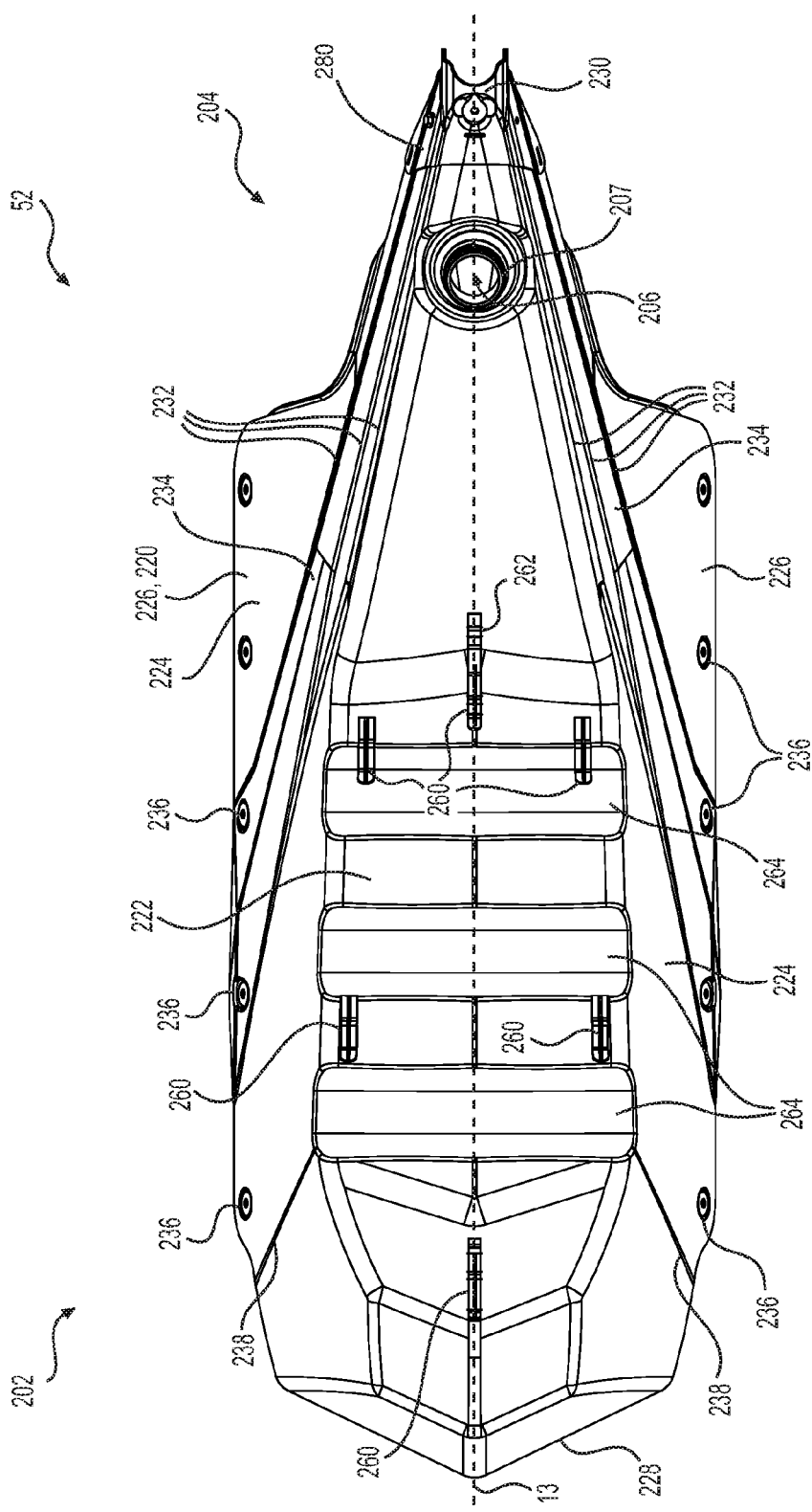
FIG. 8 is a top plan view of the fuel tank of FIG. 5.
Figure 9:
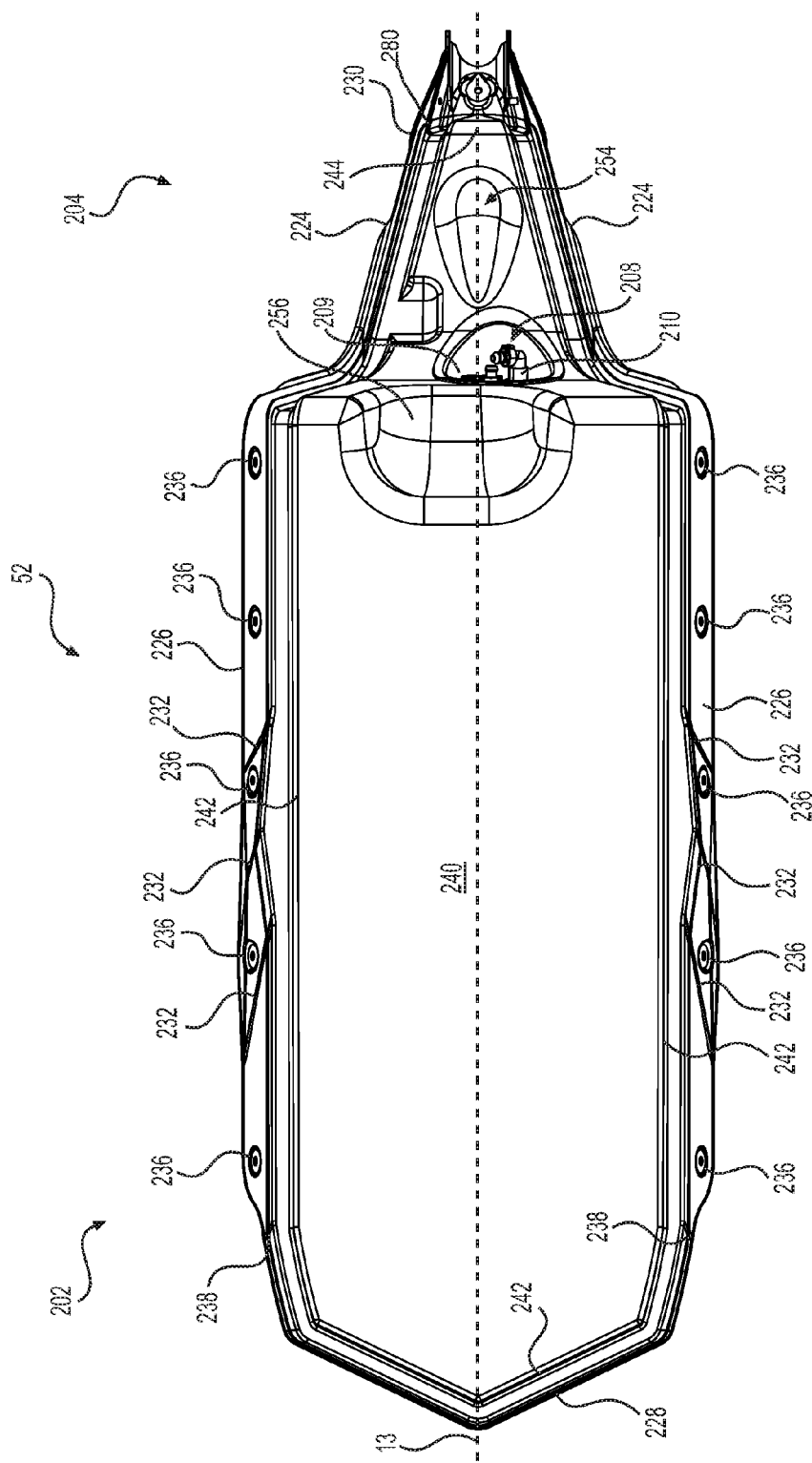
FIG. 9 is a bottom plan view of the fuel tank of FIG. 5.

With reference to FIGS. 3, 4 and 8, in the upper end portion 230, each of the upper wall side portions 224 extends generally longitudinally parallel to the longitudinal centerplane 13. Thus, each of the upper wall side portions 224 has a bend near the upper end portion 230. The upper wall 220 is reinforced by a bracket 280 near the upper end portion 230. It is contemplated that the bracket 280 could be in the form of a left reinforcing bracket extending from the upper end 230 along the left side portion 224 to the left bevel surface 124 of the tunnel 18 and a right reinforcing bracket extending from the upper end 230 along the right side portion 224 to the right bevel surface 124 of the tunnel 18. The fuel tank 52 is connected to the steering bracket 148 by the upper end portion 230. Each of the left and right side portions 224 has a pair of apertures 231 extending therethrough in the reinforced upper end portion 230. As can be seen in FIG. 4, the rear end of the left side plate 148a of the steering bracket 148 is placed on the inner surface of the left side portion 224 facing laterally inwardly towards the right side portion 224. The left plate 148a of the steering bracket 148 is connected to the fuel tank 52 by bolts inserted through the apertures 231 into the left side plate 148a of the steering bracket 148. The rear end of the right side plate 148a of the steering bracket 148 is similarly placed on the inner surface of the upper wall right side portion 224 facing laterally inwardly towards the upper wall left side portion 224 and connected thereto by bolts inserted through the apertures 231. It is contemplated that the steering bracket plates 148a could be disposed on the outer surfaces of the upper wall side portions 224 (surfaces facing away from the central portion 222). It is also contemplated that the steering bracket 148 could be configured differently than as shown herein and/or connected to the upper end portion 230 of the fuel tank 52 differently than as shown herein.

The right side portion 224 of the upper wall 220 will now be described with reference to FIGS. 2 to 12. The left side portion 224, is a mirror image of the right side portion 224, and as such, corresponding features of the left and right side portions 224 have been labeled with the same reference numbers and will not be described herein again in detail.

With reference to FIGS. 5 to 12, the right lower end portion 226 has five apertures 236 which are aligned with corresponding apertures (not shown) of the right bevel surface 124 and fastened thereto by bolts (not shown). The angle, with respect to the vertical, of the right bevel surface 124 of the tunnel 18 corresponds to the inclination angle of the planar right lower end portion 226, with respect to the vertical. The upper wall right side portion 224 can thus be directly fastened to the bevel surface 124 without using any additional brackets. The upper wall right side portion 224 extends upwardly and laterally inwardly from the right lower end portion 226 to the upper wall central portion 222. The upper wall right side portion 224 extends continuously upwardly from the right lower end portion 226.

Figure 7:
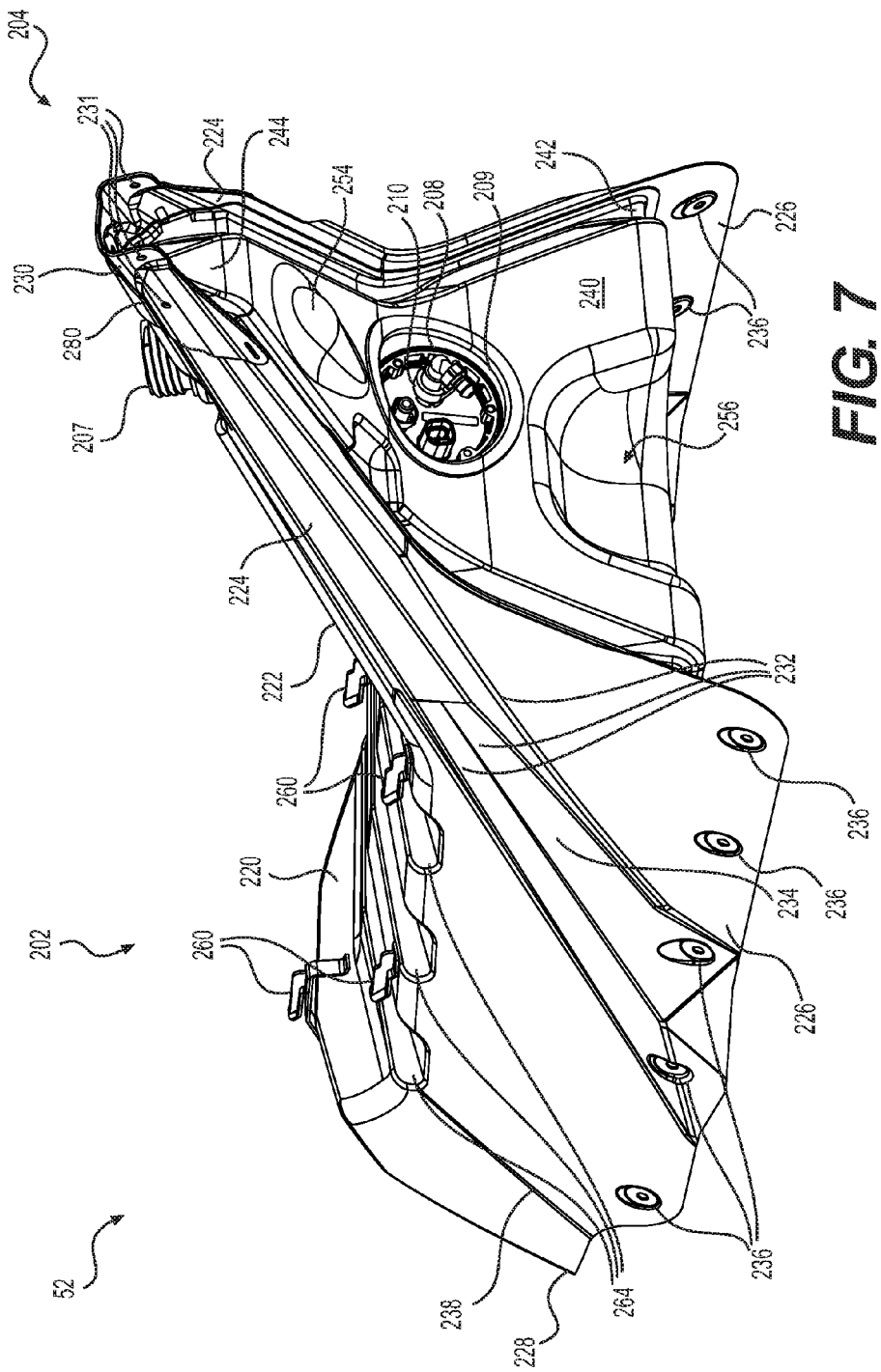
FIG. 7 is a perspective view, taken from a front, right side, of the fuel tank of FIG. 5.

With reference to FIG. 5, the right side portion 224 is generally planar in the rear portion 202 of the fuel tank 52 except for bends 232 and 238 extending generally vertically. The right side portion 224 has several bends 232, each formed along a corresponding bend axis 232a extending in a generally upwardly and forwardly direction. Each bend axis 232a passes through the upper end portion 230 and along the right side of the neck portion 204 to the lower end portion 226. Some of the bends 232 extend downward from the upper end portion 230, while other bends extend upward from the lower end portion 226. The bends 232 serve to increase the inertial strength of the upper wall 220 and help to prevent buckling. The bends 232 define a brace portion 234 in the upper wall right side portion 224 which functions as an upper rear support brace of the snowmobile frame 16 for transmitting forces from the forward support braces 108 to the tunnel 18. The brace portion 234 includes the part of the right side portion 224 encompassed between a forwardmost bend axis 232a and a rearwardmost bend axis 232a as can be seen in FIG. 5. A rear bend 238 is formed in the right side portion rearward of the right lower end portion 226. Two of the apertures 236 are defined in the brace portions 234, one aperture 236 is disposed rearward of the brace portion 234 and two apertures 236 are disposed forward of the brace portion 234. The rear bend 238 is disposed near the rear end of the fuel tank 52. Rearward of the rear bend 238, the right side portion 224 extends laterally inwardly towards the rear end, as can be seen in FIG. 7. The brace portion 234 described above, having the generally vertical bends 232, 238 provides greater strength and resistance to forces of compression and torsion than an unbent sheet metal structure. With reference to FIGS. 5 to 12, outside of the brace portion 234 and forward of the bend 238, the right side portion 224 is generally planar.

Figure 14B:
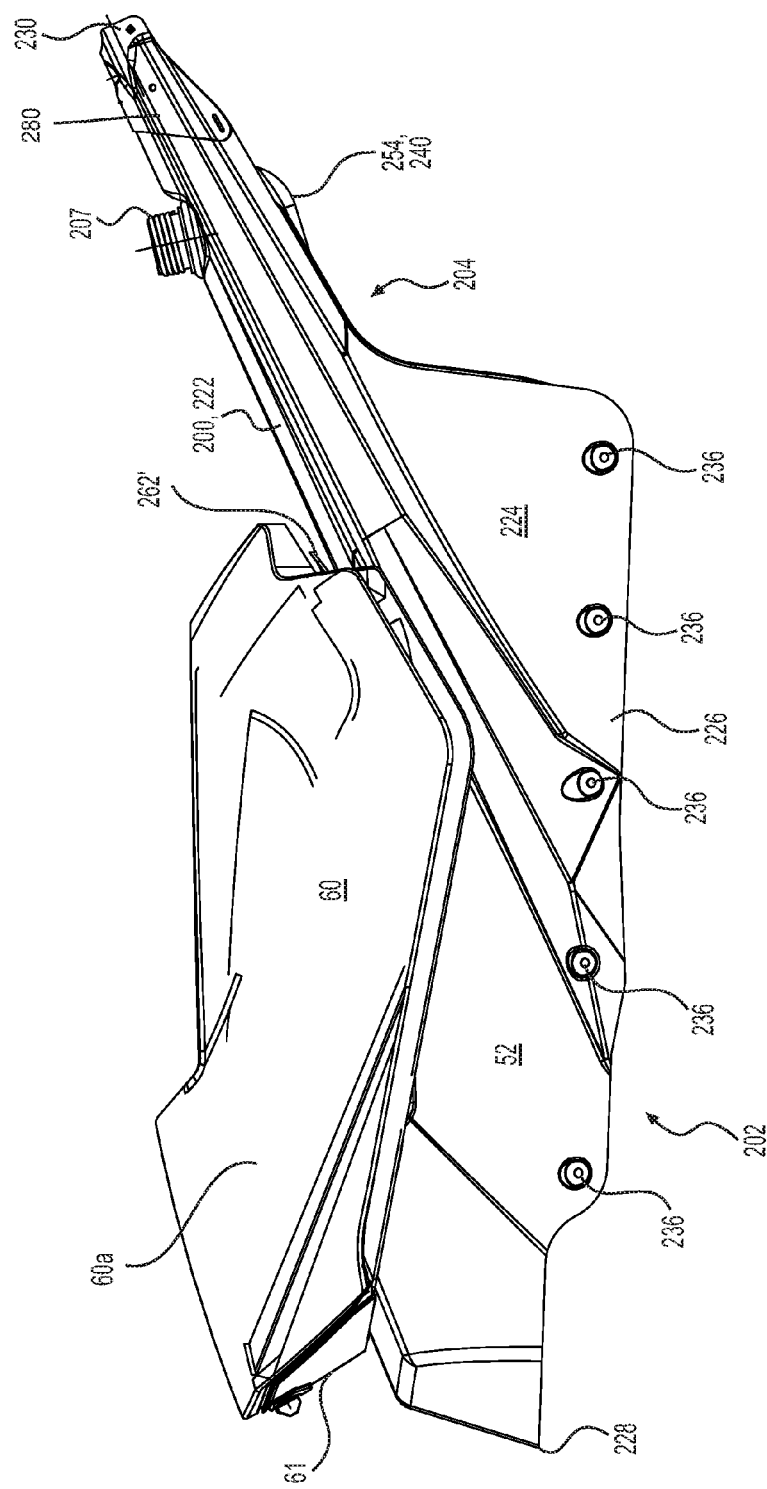
FIG. 14B is a right side elevation view of the seat and fuel tank of the snowmobile of FIG. 1.

With reference to FIG. 14B, and as mentioned above, the seat 60 is supported on the fuel tank 52. As can be seen in FIGS. 14A and 14B, the seat 60 includes a seat base 61 and a seat cushion 60a that is attached to the upper surface of the seat base 61. The seat base 61 is complementary to the upper surface of the fuel tank upper wall 220 and fits congruously thereon. The central portion 222 of the fuel tank upper wall 220 forms a number of laterally extending recesses 264 that are complementary to protrusions formed in the downward facing surface of the seat base 61. The fuel tank 52 is designed to be used with a removable seat 60. The central portion 222 of the upper wall 220 is provided with six seat fastening members 260 and a seventh larger and resilient seat fastening member 262 for fastening the seat 60 to the fuel tank 52. In the illustrated implementation of the fuel tank 52, the seat fastening members 260, 262 are in the form of hooks but it is contemplated that the seat fastening members 260 could be other than as shown, and that there could be more or less than seven seat fastening members 260, 262. A front hook 260 and a rear hook 260 are disposed along the longitudinal centerline 13. The front hook 260 is disposed just below the neck portion 204, while the rear hook 260 is disposed near the rear end of the longitudinal centerline 13. Two hooks 260 are disposed on either side of the longitudinal centerline 13 just rearward of the front hook 260. Two hooks 260 are disposed on either side of the longitudinal centerline 13 just forward of the rear hook 260. Each of the hooks 260 projects upwards from the surface of the upper fuel tank wall 220 and then rearward. The hook 262 disposed in the lower end of the neck portion 204 forward of the front hook 260 and disposed along the longitudinal centerline 13. The hook 262 projects upwardly from the upper surface of the upper fuel tank wall 220 and then forwardly. The front end of the hook 262 forms a groove 262a facing forwardly. The seat base 61 includes six slots 260' which receive the hooks 260 for fastening the seat base 61 to the fuel tank 252. The seat base 61 also has a tongue-like structure 262' extending forwardly and upwardly from the front end of its bottom surface. The seat base 61 is positioned on the upper fuel tank wall 220 so as to align the hooks 260 with the corresponding seat base slots 260', and then pushed forward so that the hooks 260 are received in the corresponding seat base slots 260'. Once the hooks 260 are received in the slots 260', the seat base 61 is pushed further forward so that the rear end 262a' of the tongue 262' slips into the forward facing groove 262a of the hook 262. When the tongue 262' is engaged with the hook 262, the seat base 61 is prevented from moving rearwards. The configuration of the hooks 260, 262 thus prevents relative movement between the fuel tank 52 and the seat 60 in the vertical, lateral and longitudinal directions. The front end of the tongue 262' remains visible in the front end of the seat 60 when the seat base 61 is fastened to the fuel tank 52 as the front end of the seat base 61 is spaced form the upper surface of the fuel tank upper wall 220. The tongue 262' is used for unfastening the seat base 61 from the fuel tank 52. The tongue 262' can be pulled upwards to disengage the rear end 262a' of the tongue 262 from the groove 262a of the hook 262. The seat base 61 can then be pushed rearwards until the fuel tank hooks 260 slide out of the corresponding seat base slots 260'. Once the fuel tank hooks 260 are free of the seat base slots 260', the seat base 61 can be removed from the fuel tank upper wall 220. U.S. Pat. No. 7,980,629 B2, issued Jul. 19, 2011, the entirety of which is incorporated herein by reference, provides additional details about removable seats, and means for attachment to the fuel tank 52.

With reference to FIGS. 4, 7, 9, 10, 12, 13 and 15 the lower wall 240 is connected to the inner surface of the upper wall 220 so as to enclose a volume 250 (FIG. 4) therebetween. The lower wall 240 extends laterally from the left side portion 224 of the upper wall 220 to the right side portion 224 thereof. The lower wall 240 extends generally horizontally in the rear portion 202 of the fuel tank 52. In the neck portion 204 of the fuel tank 52, the lower wall 240 extends upwardly and forwardly to an upper end portion 244 which extends generally vertically. In the neck portion 204 of the fuel tank 252, the lower wall 240 is disposed in front of the upwardly and forwardly extending central portion 222 of the upper wall 220. The upper wall upper end portion 230 extends above the lower upper end portion 244 and longitudinally forwardly thereof.

The lower wall 240 has a lip 242 formed along its edge, and is connected to the upper wall 220 by the lip 242. The lip 242 at the rear edge of the lower wall 240 is connected to the inner surface of the upper wall 220 just above the rear edge 228. The lip 242 extending along the left edge of the lower wall 240 is connected to the inner surface of the left side portion 224 of the upper wall 220 at a location above its lower edge. The lip 242 extending along the right edge of the lower wall 240 is connected to the inner surface of the right side portion 224 at a location above its lower edge. The left and right lower end portions 226 of the upper fuel tank wall 220 extend lower than lip 242. A vibration damper 252 (best seen in FIG. 16A) is placed between the lower wall 240 and the heat exchanger disposed across the top of the gap 121 of the tunnel 18 to reduce transmission of vibrations from the tunnel 18 via the heat exchanger 25 to the lower fuel tank wall 240 The lower wall 240 is disposed spaced from the tunnel 18 as can be seen clearly in FIG. 15.

In the neck portion 204 of the fuel tank 52, the lip 242 of the upper end portion 244 is connected to the central portion 222 of the upper wall 220 just below the upper end portion 230. The steering bracket 148 is thus connected to the left and right side portions 224 of the upper wall 220 longitudinally forward of the connection of the lip 242. The lower wall 240 is thus spaced from the steering bracket 148.

The position of the connection of the lower wall 240 to the upper wall 220 ensures that forces transmitted from the forward support 102 to the tunnel 18 via the fuel tank 52 are transmitted through the upper wall 220 without passing through the lower wall 240. Thus, the connection between the upper and lower fuel tank walls 220, 240 is not compromised by the forces being transmitted via the fuel tank 52 between the front and rear of the snowmobile frame 16.

In the illustrated implementation of the fuel tank 52, the lip 242 is connected to the upper fuel tank wall 220 by welding. It is however contemplated that the lower wall 240 could be connected to the upper wall 220 by means other than welding. For example, the lower wall 240 could be connected to the upper wall 220 by a fasteners, by gluing, or by Friction Stir Welding.

With reference to FIGS. 4, 7, 9 and 10, in the neck portion 204 of the fuel tank 52, the lower wall 240 bulges forwardly away from the upper wall 220 to form a rearward facing recess 254. The recess 254 is disposed just below the upper end portion 244. As can be seen best in FIG. 4, the rearward facing recess 254 is disposed directly opposite the fuel tank fill opening 206 defined in the upper wall 220 such that a fuel nozzle inserted into the fuel tank 52 through the fill opening 206 and fill tube 207 is received in the recess 254. The shape and size of the recess 254, in combination with the length of the fill tube 207, is selected so as to accommodate a typical fuel nozzle. The recess 254 allows the fill opening 206 to be located in the neck portion 204 while allowing a spacing between the upper and lower fuel tank walls 220, 240 outside of the recess 254 to be relatively smaller than the length of the fuel nozzle.

The lower wall 240 has a fuel outlet opening 208 defined in the front facing surface of the front portion of the lower wall 240 below the recess 254. The fuel outlet opening 208 is defined in a portion where the lower fuel tank wall 240 extends rearwardly to form a circular recess 209. As can be seen best in FIG. 4, a fuel pump 210 is housed inside the volume 250 of the fuel tank 52 and is connected to fuel outlet opening 208. The fuel pump 210 is used to feed fuel from the fuel tank 10 to the fuel injection system (not shown) of the engine 50. The fuel outlet opening 208 is disposed rearward of the fill opening 206 and vertically lower thereof.

Below the fuel outlet opening 208, a central portion of the lower fuel tank wall 240 bulges rearwardly to form another forward facing recess 256. The recess 256 is formed to accommodate other components of the snowmobile.

Figure 16A:
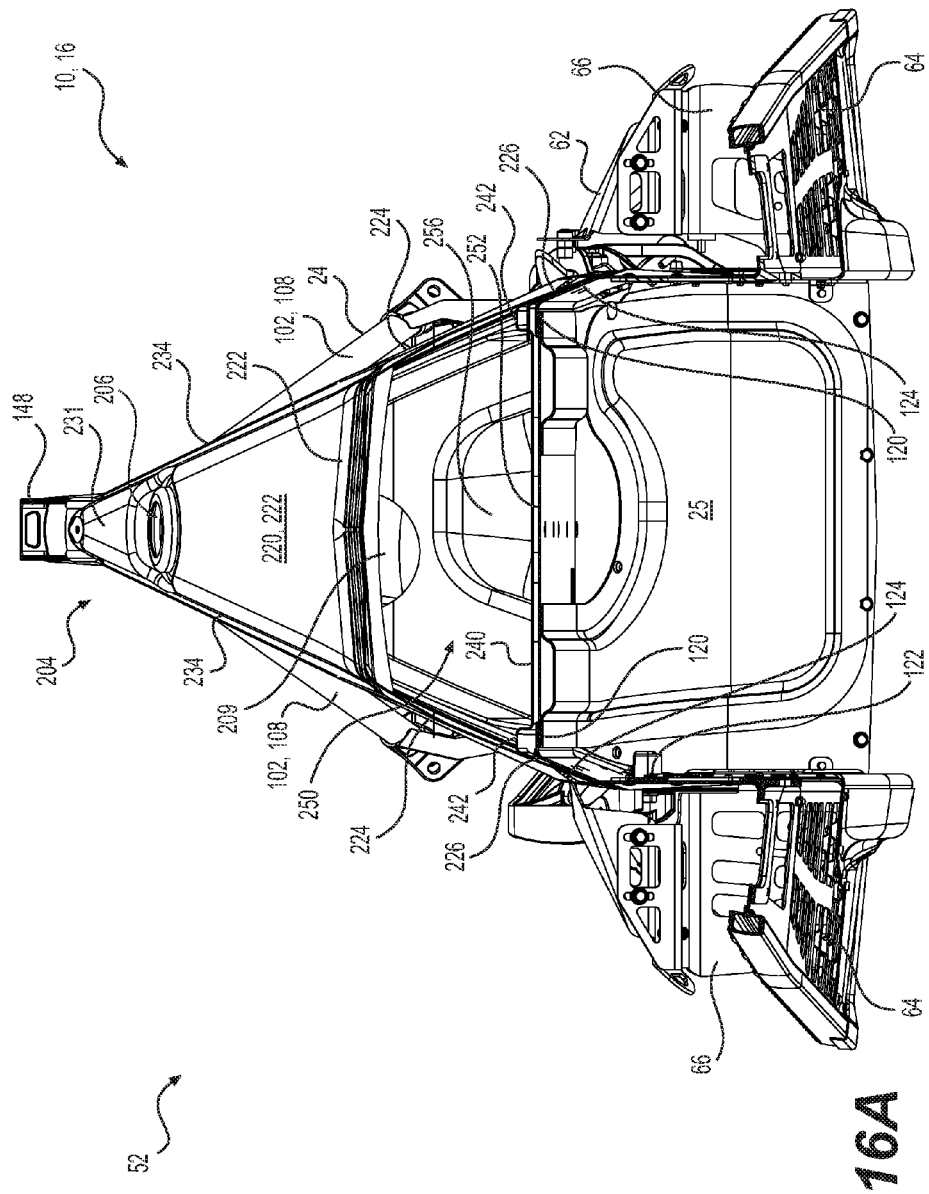
FIG. 16A is a cross-sectional view of a frame of a snowmobile according to another implementation, taken along a line corresponding to the line 16-16 of FIG. 2.

Each of the upper and lower fuel tank walls 220, 240 is formed of a single piece of sheet metal. The sheet metal piece is stamped or subjected to super plastic forming to form the structure as described above. A lower portion of the fill tube 207 is formed with the upper wall 220 and the threaded upper portion of the fill tube 207 is formed separately and welded to the upper portion thereafter. It is however contemplated that the entire fill tube 207 could be formed with the upper wall 220. FIG. 16A shown another implementation of a snowmobile 10' in which the fuel tank 52 is shown before the fill tube 207 is welded to the inlet 206. In the illustrated implementation, the upper and lower fuel tank walls 220, 240 are formed of aluminum, but it is contemplated that the fuel tank 52 could be constructed of other suitable materials and/or by other suitable processes than those described herein.

Forming the entire upper wall out of a single piece of sheet metal allows the upper end portion 230 and the lower end portions 226 to be connected to other vehicle portions (steering bracket 148 and tunnel 18 respectively) directly without the need for using separate attachment brackets. Connecting the fuel tank 52, directly to the other snowmobile portions without using additional brackets helps to reduce the overall weight of the snowmobile 10, and also to reduce assembly complexity and cost.

The fuel tank 10 described herein is a structural fuel tank 10, providing a very stable and rigid support structure for the snowmobile 1, with enhanced torsional and structural rigidity. The structural fuel tank 10 helps prevent bending or torsion between the tunnel 18 and the engine cradle 102 and/or the front suspension module 104. The frame 16, as described herein, thus helps reduce torsional bending in the snowmobile 10, and helps prevent transmission of bending moments from the front 2 to rear 3 of the snowmobile 10. Incorporating the fuel tank 10 into the frame 16 allows for elimination of rear support braces for connecting the forward support braces 108 to the tunnel 18 without subtracting from the rigidity or the stability of the frame 16 and of the snowmobile 10. A reduction of components without loss of functionality enables a cheaper and more efficient manufacturing process. Elimination of the rear support braces and incorporation of the fuel tank into the frame 16 simplifies assembly and disassembly of the snowmobile and also provides more flexibility in the configuration of its components and their placement in the snowmobile relative to each other. Additionally, the snowmobile 10 is made lighter in weight and stronger in structure by using the frame 16 having the fuel tank 10 as described herein as compared to frames in which the tunnel 18 is connected to the steering bracket 148 by rear support braces that are distinct from the fuel tank.

With reference to FIGS. 16A and 16B, another implementation of the snowmobile 10' is shown. The snowmobile 10' is similar to the snowmobile 10 described above. Corresponding and similar features of the snowmobile 10 and 10' have been labelled with the same reference numbers, and will not be discussed herein again.

The lower left end portion 226 of the fuel tank 52 of the snowmobile 10' has a recessed portion 236' around each aperture 236 through which a bolt is inserted to fasten the fuel tank 52 to the tunnel bevel surface 124. The inner surface (surface facing the tunnel 18) of the recessed portions 236' is in contact with the left bevel surface 124 as seen best in FIG. 16B. The inner surface of the left lower end portion 226 above the recessed portion 236' is spaced from the tunnel bevel surface 124. Each recessed portion 236 receive the head of a bolt (not shown) by which the fuel tank 52 is fastened to the tunnel 18. The recessed portion 236' helps to keep the head of the bolt from projecting laterally outwardly of the surface of the left lower end portion 226, and helps to reduce the possibility something being inadvertently being hooking to the bolt. It is contemplated that the recessed portions 236' could be omitted as in the snowmobile 10 of FIGS. 1 to 4. The lower right end portion 226 of the fuel tank 52 of the snowmobile 10' is a mirror image of the lower left end portion thereof, and as such will not be described herein again.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A snowmobile comprising:
   a frame;
   at least one ski;
   a front suspension assembly operatively connected to the frame and the at least one ski;
   a rear suspension assembly operatively connected to the frame;
   an endless track operatively connected to the rear suspension assembly;
   an engine operatively connected to the frame and the endless track;
   the frame comprising:
      a tunnel extending longitudinally and defining a longitudinal centerplane for the vehicle, the rear suspension assembly being operatively connected to the tunnel;
      an engine cradle connected to the tunnel and extending forwardly therefrom, the engine being supported at least in part by the engine cradle;
      a front suspension module connected to the engine cradle and extending forwardly therefrom, the front suspension assembly being operatively connected to the front suspension module;
      a forward support connected to at least one of the front suspension module and the engine cradle, the forward support extending rearwardly and upwardly from the at least one of the front suspension module and the engine cradle; and
      a fuel tank comprising a lower fuel tank wall and an upper fuel tank wall connected thereto to enclose a volume therebetween, the volume fluidly communicating with the engine, the volume having a portion extending upwardly and forwardly from the tunnel to the forward support,
   the fuel tank being removably connected to the tunnel and the forward support by the upper fuel tank wall, the upper fuel tank wall comprising:
      a left lower end portion connected to the tunnel on a left side of the longitudinal centerplane;
      a right lower end portion connected to the tunnel on a right side of the longitudinal centerplane; and
      an upper end portion connected to the forward support,
   the lower fuel tank wall being connected to the upper fuel tank wall above the left and right lower end portions and below the upper end portion,
   a force transmitted between the forward support and the tunnel via the fuel tank thereby being transmitted through the upper fuel tank wall without passing through the lower fuel tank wall.

2. The snowmobile of claim 1, wherein the upper fuel tank wall comprises:
   a left side portion extending generally vertically and comprising the left lower end portion;
   a right side portion extending generally vertically and comprising the right lower end portion; and
   a central portion being formed integrally with the left and right side portions, the left side portion extending generally upwardly from the left lower end portion to the central portion, the right side portion extending generally upwardly from the right lower end portion to the central portion, and the central portion extending laterally between the left and right side portions.

3. The snowmobile of claim 2, wherein the lower fuel tank wall extends generally horizontally from the left side portion to the right side portion of the upper fuel tank wall.

4. The snowmobile of claim 2, wherein:
   the left side portion comprises a left bend disposed along a left bend axis extending through the left lower end portion and the upper end portion; and
   the right side portion comprises a right bend disposed along a right bend axis extending through the right lower end portion and the upper end portion.

5. The snowmobile of claim 4, wherein:
   the left bend extends from the upper end portion toward the left lower end portion; and
   the right bend extends from the upper end portion toward the right lower end portion.

6. The snowmobile of claim 4, wherein:
   the left bend extends from the left lower end portion toward the upper end portion; and
   the right bend extends from the right lower end portion toward the upper end portion.

7. The snowmobile of claim 1, wherein the tunnel comprises:
a top surface extending generally horizontally and comprising a left edge and a right edge;
a left bevel surface extending downwardly and leftwardly from the left edge of the top surface;
a left side surface extending downwardly from the left bevel surface;
a right bevel surface extending downwardly and rightwardly from the right edge of the top surface; and
a right side surface extending downwardly from the right bevel surface, and
wherein:
the left lower end portion of the upper fuel tank wall is disposed on the left bevel surface and connected thereto; and
the right lower end portion of the upper fuel tank wall is disposed on the right bevel surface and connected thereto.

8. The snowmobile of claim 7, wherein:
at least a portion of the left bevel surface connected to the left lower end portion is planar; and
at least a portion of the right bevel surface connected to the right lower end portion is planar.

9. The snowmobile of claim 8, wherein:
a portion of the left side portion is planar and extends along the planar left bevel surface portion and continuously upwardly therefrom; and
a portion of the right side portion is planar and extends along the planar right bevel surface portion and continuously upwardly therefrom.

10. The snowmobile of claim 2, further comprising a fill opening defined in the central portion of the upper fuel tank wall and fluidly communicating with the volume.

11. The snowmobile of claim 10, wherein the fill opening is defined in a portion of the central portion extending upwardly and forwardly toward the upper end portion.

12. The snowmobile of claim 10, further comprising a recess formed by one of the upper and the lower fuel tank walls disposed opposite the fill opening and extending away therefrom, the recess being configured to accommodate a fuel nozzle inserted into the volume through the fill opening.

13. The snowmobile of claim 12, wherein the recess is formed by the lower fuel tank wall.

14. The snowmobile of claim 1, further comprising:
at least one seat fastening member connected to an outer surface of the upper fuel tank wall facing away from the lower fuel tank wall; and
a seat disposed at least in part on the upper fuel tank wall and fastened to the fuel tank via the at least one seat fastening member.

15. The snowmobile of claim 14, wherein at least one of the at least one seat fastening member is a hook.

16. The snowmobile of claim 1, further comprising a lip formed around a periphery of the lower fuel tank wall, the lip connecting the lower fuel tank wall to the upper fuel tank wall.

17. The snowmobile of claim 1, wherein the lower fuel tank wall is connected to the upper fuel tank wall by at least one of:
a welding connection;
a glued connection; and
a fastener connection.

18. The snowmobile of claim 1, wherein the lower fuel tank wall is spaced from the tunnel.

19. The snowmobile of claim 1, further comprising a vibration damper disposed between the tunnel and the lower fuel tank wall.

20. The snowmobile of claim 1, wherein the upper end portion connected to the forward support is reinforced.

21. The snowmobile of claim 1, wherein, each of the upper and lower fuel tank walls is formed by one of:
stamping; and
super plastic forming.

22. The snowmobile of claim 1, comprising a fuel tank outlet opening defined in one of the upper and lower fuel tank walls, the fuel tank outlet opening fluidly communicating with the volume and being connected to the engine to supply fuel thereto.

23. The snowmobile of claim 22, wherein the fuel tank outlet opening is defined in the lower fuel tank wall.

24. The snowmobile of claim 1, further comprising a steering bracket rotatably supporting a steering column extending therethrough, the steering bracket being directly connected to the upper end portion of the upper fuel tank wall and to the forward support.

25. The snowmobile of claim 24, wherein the steering bracket is connected to a longitudinally and vertically extending surface of the fuel tank.

26. The snowmobile of claim 24, further comprising a fill opening defined in the upper fuel tank wall and fluidly communicating with the volume, the steering bracket being connected to the upper end portion longitudinally forward of the fill opening.

* * * * *